United States Patent
Oh et al.

(10) Patent No.: US 7,588,859 B1
(45) Date of Patent: Sep. 15, 2009

(54) ELECTROLYTE FOR USE IN ELECTROCHEMICAL DEVICES

(76) Inventors: Bookeun Oh, 2844 Windosr Dr., #106, Lisle, IL (US) 60532; Robert C. West, 305 Nautilus Dr., Madison, WI (US) 53705; Khalil Amine, 6813 Penner Pl., Downers Grove, IL (US) 60516

( * ) Notice: Subject to any disclaimer, the term of this patent is extended or adjusted under 35 U.S.C. 154(b) by 989 days.

(21) Appl. No.: 10/810,080

(22) Filed: Mar. 25, 2004

Related U.S. Application Data

(60) Provisional application No. 60/543,951, filed on Feb. 11, 2004.

(51) Int. Cl.
  H01M 6/18 (2006.01)
  H01M 4/58 (2006.01)
  H01M 6/04 (2006.01)
(52) U.S. Cl. ............. 429/188; 429/306; 429/313; 429/317; 429/231.9; 252/62.2
(58) Field of Classification Search .......... None
  See application file for complete search history.

(56) References Cited

U.S. PATENT DOCUMENTS

| | | | |
|---|---|---|---|
| 3,172,899 A | 3/1965 | Bailey | |
| 3,530,159 A | 9/1970 | Guinet et al. | |
| 3,734,876 A | 5/1973 | Chu | |
| 4,259,467 A | 3/1981 | Keogh et al. | |
| 4,830,939 A | 5/1989 | Lee et al. | |
| 4,849,856 A | 7/1989 | Funari et al. | |
| 4,908,283 A | 3/1990 | Takahashi et al. | |
| 5,037,712 A | 8/1991 | Shackle et al. | |
| 5,112,512 A | 5/1992 | Nakamura | |
| 5,272,021 A | 12/1993 | Asai et al. | |
| 5,294,501 A * | 3/1994 | Chaloner-Gill | 429/313 |
| 5,300,375 A | 4/1994 | Chaloner-Gill | |
| 5,362,493 A | 11/1994 | Skotheim et al. | |

(Continued)

FOREIGN PATENT DOCUMENTS

EP  0 450 981 A1  10/1991

(Continued)

OTHER PUBLICATIONS

M. Armand, New Electrode Material, Proceedings of the NATO Sponsored Advanced Study Institute on Fast Ion Transport in Solids, Solid State Batteries and Devices, 1972, Belgirate, Italy.

(Continued)

*Primary Examiner*—Dah-Wei D Yuan
*Assistant Examiner*—Kwang Han
(74) *Attorney, Agent, or Firm*—Gavrilouch Dodd & Lindsey LLP

(57) ABSTRACT

The electrolyte includes one or more polysiloxanes, one or more alkali metal salts, and one or more silanes. At least one polysiloxane includes side chains having poly(alkylene oxide) moieties. At east one silane includes at least one moiety selected from a first group consisting of an alkyl group, a halogenated alkyl group, an aryl group, a halogenated aryl group, an alkoxy group and an oxyalkylene group and at least one moiety selected from a second group consisting of an alkoxy group, an oxyalkylene group and a carbonate group. In one example, the electrochemical device is a secondary battery.

73 Claims, 5 Drawing Sheets

U.S. PATENT DOCUMENTS

| | | | |
|---|---|---|---|
| 5,419,984 | A | 5/1995 | Chaloner-Gill et al. |
| 5,475,127 | A | 12/1995 | Klein et al. |
| 5,538,812 | A | 7/1996 | Lee et al. |
| 5,593,787 | A | 1/1997 | Dauth et al. |
| 5,609,974 | A | 3/1997 | Sun |
| 5,633,098 | A | 5/1997 | Narang et al. |
| 5,690,702 | A | 11/1997 | Skotheim et al. |
| 5,700,300 | A | 12/1997 | Jensen et al. |
| 5,731,104 | A | 3/1998 | Ventura et al. |
| 5,753,389 | A | 5/1998 | Gan et al. |
| 5,772,934 | A | 6/1998 | MacFadden |
| 5,882,812 | A | 3/1999 | Visco et al. |
| 5,885,733 | A | 3/1999 | Ohsawa et al. |
| 5,919,587 | A | 7/1999 | Mukherjee et al. |
| 5,961,672 | A | 10/1999 | Skotheim et al. |
| 6,013,393 | A | 1/2000 | Taniuchi et al. |
| 6,015,638 | A | 1/2000 | Ventura et al. |
| 6,124,062 | A | 9/2000 | Horie et al. |
| 6,168,885 | B1 | 1/2001 | Narang et al. |
| 6,181,545 | B1 | 1/2001 | Amatucci et al. |
| 6,245,465 | B1 | 6/2001 | Angell et al. |
| 6,248,481 | B1 | 6/2001 | Visco et al. |
| 6,252,762 | B1 | 6/2001 | Amatucci |
| 6,268,088 | B1 | 7/2001 | Oh et al. |
| 6,337,383 | B1 | 1/2002 | West et al. |
| 6,447,952 | B1 | 9/2002 | Spiegel et al. |
| 6,482,912 | B2 | 11/2002 | Boudjouk et al. |
| 6,495,287 | B1 | 12/2002 | Kolb et al. |
| 6,573,009 | B1 | 6/2003 | Noda et al. |
| 6,610,109 | B2 | 8/2003 | Noh |
| 6,642,294 | B1 * | 11/2003 | Bauer et al. ............... 524/430 |
| 6,653,015 | B2 | 11/2003 | Yoshida et al. |
| 6,783,897 | B2 * | 8/2004 | Kang et al. ............... 429/313 |
| 7,172,834 | B1 * | 2/2007 | Jow et al. ................. 429/188 |
| 2002/0028388 | A1 | 3/2002 | Lee |
| 2002/0051911 | A1 * | 5/2002 | Okada ....................... 429/313 |
| 2002/0192554 | A1 | 12/2002 | Woo et al. |
| 2003/0036003 | A1 | 2/2003 | Shchori et al. |
| 2003/0099884 | A1 | 5/2003 | Chiang et al. |
| 2003/0104282 | A1 | 6/2003 | Xing et al. |
| 2003/0180624 | A1 | 9/2003 | Oh et al. |
| 2003/0180625 | A1 | 9/2003 | Oh et al. |
| 2003/0198869 | A1 | 10/2003 | West et al. |
| 2004/0197665 | A1 * | 10/2004 | Amine et al. ............... 429/313 |

FOREIGN PATENT DOCUMENTS

| | | | |
|---|---|---|---|
| EP | 0 525 728 | A1 | 2/1993 |
| EP | 0 581 296 | A2 | 2/1994 |
| EP | 0 581 296 | A3 | 2/1994 |
| EP | 0 922 049 | B1 | 2/1998 |
| EP | 0 932 215 | A1 | 1/1999 |
| EP | 0 796 511 | B1 | 8/1999 |
| EP | 1 024 502 | A1 | 8/2000 |
| EP | 0 932 215 | B1 | 5/2001 |
| EP | 1 202 374 | A1 | 5/2002 |
| JP | 57-034661 | | 2/1982 |
| JP | 57-034662 | | 2/1982 |
| JP | 57-080670 | | 5/1982 |
| JP | 57-111957 | | 7/1982 |
| JP | 57-176669 | A2 | 10/1982 |
| JP | 59-224072 | A2 | 12/1984 |
| JP | 60-195877 | | 10/1985 |
| JP | 60-216461 | | 10/1985 |
| JP | 61-288374 | | 12/1986 |
| JP | 62-209169 | A2 | 9/1987 |
| JP | 63-010466 | | 1/1988 |
| JP | 63-310569 | | 12/1988 |
| JP | 02-080462 | | 3/1990 |
| JP | 02-262274 | | 10/1990 |
| JP | 02-291603 | | 12/1990 |
| JP | 03-139566 | | 6/1991 |
| JP | 60-052893 | A2 | 7/1992 |
| JP | 05-036441 | | 2/1993 |
| JP | 05-290616 | | 11/1993 |
| JP | 07-320782 | | 12/1995 |
| JP | 08-078053 | A2 | 3/1996 |
| JP | 09-306544 | | 11/1997 |
| JP | 11-214032 | A2 | 1/1998 |
| JP | 10-172615 | A2 | 6/1998 |
| JP | 11-185804 | | 7/1999 |
| JP | 11-238523 | | 8/1999 |
| JP | 11-302383 | | 11/1999 |
| JP | 11-302384 | A2 | 11/1999 |
| JP | 11-306856 | A2 | 11/1999 |
| JP | 11-306857 | A2 | 11/1999 |
| JP | 2000-058123 | | 2/2000 |
| JP | 2000-154254 | A2 | 6/2000 |
| JP | 2000-222939 | A2 | 8/2000 |
| JP | 2000-277152 | A2 | 10/2000 |
| JP | 2001-068115 | | 3/2001 |
| JP | 2001-110455 | A2 | 4/2001 |
| JP | 2001-185165 | A2 | 7/2001 |
| JP | 2001-283907 | A2 | 10/2001 |
| JP | 2001-283913 | | 10/2001 |
| JP | 2002-063936 | A2 | 2/2002 |
| JP | 2002-151150 | A2 | 5/2002 |
| JP | 2002155142 | A2 | 5/2002 |
| JP | 2002-298913 | A2 | 10/2002 |
| JP | 2002-343440 | A2 | 11/2002 |
| JP | 2003-002974 | A2 | 1/2003 |
| WO | WO 96/21953 | | 7/1996 |
| WO | WO 98/07729 | A1 | 2/1998 |
| WO | WO 00/00495 | A1 | 1/2000 |
| WO | WO 00/08654 | | 2/2000 |
| WO | WO 00/25323 | A1 | 5/2000 |
| WO | WO 01/73884 | A1 | 10/2001 |
| WO | WO 01/96446 | A1 | 12/2001 |
| WO | WO 01/99209 | A2 | 12/2001 |
| WO | WO 03/083970 | A1 | 10/2003 |
| WO | WO 03/083971 | A1 | 10/2003 |
| WO | WO 03/083972 | A1 | 10/2003 |
| WO | WO 03/083973 | A1 | 10/2003 |
| WO | WO 03/083974 | A1 | 10/2003 |
| WO | WO 03/090299 | A1 | 10/2003 |

OTHER PUBLICATIONS

D. Fenton et al., Complexes of Alkali Metal Ions with Poly(Ethylene Oxide), Polymer, Nov. 1973, 589, 14.

E. Tsuchida et al., Conduction of Lithium Ions in Polyvinylidene Fluoride and its Derivatives-I, Electrochimica Acta, 1983, 591-595, 28(5).

L. Hardy et al., Chloride Ion Conductivity in a Plasticized Quaternary Ammonium Polymer, Macromolecules, 1984, 975-977, 17.

P. Blonsky et al., Polyphosphazene Solid Electrolytes, Journal of American Chemical Society, 1984, 6854-6855, 106.

D. Bannister et al., A Water-Soluble Siloxane: Poly(ethylene glycol) Comb Polymer, Journal of Polymer Science: Polymer Letters Edition, 1985, 465-467, 23.

I. Kelly et al., Poly(Ethylene Oxide) Electrolytes for Operation at Near Room Temperature, Journal of Power Sources, 1985, 13-21, 14.

D. Fish et al., Conductivity of Solid Complexes of Lithium Perchlorate with Poly{[w-methoxyhexa(oxyethylene)ethoxy]methylsiloxane} $^{a)}$, Makromol. Chem., Rapid Commun., 1986, 115-120, 7.

P. Hall et al. Ion Conductivity in Polysiloxane Comb Polymers With Ethylene Glycol Teeth, Polymer Communications, 1986, 3 pages, 27.

D.R. MacFarlane et al., Synthesis and Aqueous Solution Phase Behavior of Siloxane-Poly (Alkylene Glycol) Comb Copolymers, Department of Chemistry, Monash University, Clayton, Victoria, Australia, *Polymer Preprints*, 1987, 28, 405-406.

D. Fish et al., Polymer Electrolyte Complexes of $ClO_4$ and Comb Polymers of Siloxane with Oligo-oxyethylene Side Chains, British Polymer Journal, 1988, 281-288, 20, 3.

S. Ganapathiappan et al., A New Class of Cation Conductors: Polyphosphazene Sulfonates, Macromolecules, 1988, 2299-2301, 21.

I. Khan et al., Comblike Polysiloxanes with Oligo(oxyethylene) Side Chains, Synthesis and Properties, Macromolecules, 1988, 2684-2689, 21.

R. Spindler et al., Investigations of a Siloxane-Based Polymer Electrolyte Employing $^{13}$C, $^{29}$Si, $^{7}$Li, and $^{23}$Na Solid State NMR Spectroscopy, Journal of American Chemical Society, 1988, 3036-3043, 110.

R. Spindler et al., Synthesis NMR Characterization, and Electrical Properties of Siloxane-Based Polymer Electrolytes, Macromolecules, 1988, 648-654, 21.

S. Ganapathiappan et al., Synthesis, Characterization and Electrical Response of Phosphazene Polyelectrolytes, Journal of America Chemical Society, 1989, 4091-4095, 111.

L. Dominey et al., Thermally Stable Lithium Salts for Polymer Electrolytes, Electrochimica Acta, 1992, 1551-1554, 37(9).

F. Alloin et al., Triblock Copolymers and Networks Incorporating Oligo (Oxyethylene) Chains, Solid State Ionics, 1993, 3-9, 60.

C. St. Pierre et al., Lithium-Metal-Polymer Battery for Electric Vehicle and Hybrid Electric Vehicle Applications, www.avestor.com/en/automotive.html, info@avestor.com, 1993, 11 pages.

G. Zhou et al., Solvent-Free Cation-Conduction Polysiloxane Electrolytes with Pendant Oligo(oxyethylene) and Sulfonate Groups, Macromolecules, 1993, 2202-2208, 26.

M. Gauthier et al., Large Lithium Polymer Battery Development The Immobile Solvent Concept, Journal of Power Sources, 1995, 163-169, 54.

K. Abraham et al., Highly Conductive PEO-Like Polymer Electrolytes, Journal of Chemical Materials, 1997, 1978-1988, 9(9).

M. Furlani et al., Time Resolved Luminescence and Vibrational Spectroscopic Studies on Complexes of Poly(Ethylene Oxide) Oligomers and Eu(TFSI)$_3$ Salt, 11$^{th}$ International Conference on Solid State Ionics, 1997, 10 pages.

J. Gnanaraj et al., Studies on Comb-like Polymer Blend with Poly(Ethylene Oxide)—Lithium Perchlorate Salt Complex Electrolyte, Polymer, 1997, 3709-3712, 38(14).

F. Gray, Polymer Electrolytes, RSC Materials Monographs, UK, 1997, 46-49.

S. Kohama et al., Alcoholysis of Poly(methylhydrogensiloxane), Journal of Applied Sciences, 1997, 21, 863-867.

C. Letourneau et al., Progress in Lithium-Metal-Polymer Battery System for Electric Vehicles, http://www.avestor.com/iactivefiles/evs15.pdf, info@avestor.com, INTELEC, Oct. 1998, Canada, 1-10.

R. Hooper et al., A Highly Conductive Solid-State Polymer Electrolyte Based on a Double-Comb Polysiloxane Polymer with Oligo(Ethylene Oxide) Side Chains, Organometallics, American Chemical Society, 1999, 3249-3251, 18(17).

Z. Wang et al., Thermal, Electrochemical, and Spectroscopic Characterizations of Hyperbranched Polymer Electrolyte, Journal of Electrochemical Society, 1999, 2209-2215, 146(6).

M. Anderman et al., Advanced Batteries for Electric Vehicles: An Assessment of Performance, Cost, and Availability, Prepared for State of California Air Resources Board by The Year 2000 Battery Technology Advisory Panel, 2000, i-ix and 60-65.

A. Reiche et al., Gel Electrolytes on the Basis of Oligo(Ethylene Glycol)$_n$ Dimethacrylates—Thermal, Mechanical and Electrochemical Properties in Relationship to the Network Structure, Polymer, 2000, 3821-3836, 41.

R. Hooper et al., Highly Conductive Siloxane Polymers, Macromolecules, 2001, 931-936, 34.

X. Hou et al., Novel Interpenetrating Polymer Network Electrolytes, Polymer, 2001, 4181-4188, 42.

C.F. Rome, The Unique Properties of Silicone at the Service of the Petroleum Industry, Hydrocarbon Asia, 2001, 42-49, 'www.hcasia.safan.com/mag/may-jun01/Tech-Silicone.pdf'.

N. Katayama et al., Thermal Stability of Propylene Carbonate and Ethylene Carbonate-Propylene Carbonate-Based Electrolytes for Use in Li Cells, Journal of Power Sources, 2002, 1-6, 4769, http://www.sciencedirect.com/web-editions.

K. Xu et al., LiBOB as Salt for Lithium-Ion Batteries, Electrochemical and Solid State Letters, 2002, pp. A26-A29, vol. 5(1).

J. Alper, The Battery: Not Yet a Terminal Case, Science, May 2002, 1224-1226, vol. 296, www.sciencemag.org.

B. Oh et al., New Interpenetrating Electrolyte Network-Type Siloxane Polymer Electrolyte, Electrochemical and Solid State Letters, 2002, E59-E61, 5(11), The Electrochemical Society, Inc., Sep. 11, 2002.

International Search Report, dated May 1, 2003, received in relation to Application No. PCT/US03/02127.

International Search Report, dated Jul. 11, 2003, received in relation to Application No. PCT/US03/02128.

International Search Report, dated Jul. 11, 2003, received in relation to Application No. PCT/US03/08740.

International Search Report, dated Sep. 12, 2003, received in relation to Application No. PCT/US03/08784.

International Search Report, dated Oct. 9, 2003, received in relation to Application No. PCT/US03/08779.

International Search Report, dated Oct. 9, 2003, received in relation to Application No. PCT/US03/08783.

Nicodom Ltd., Inorganic Library of FT-IR Spectra Inorganics II—Boron Compounds, homepage, website http://www.ftir.cz/INLIB2.html and http://www.ftir.cz/home_page_of_nicodom_sro.htm.

M. Ouchi et al., Convenient and Efficient Tosylation of Oligoethylene Glycois and the Related Alcohols in Tetrahydrofuran-Water in the Presence of Sodium Hydroxide, The Chemical Society of Japan, Apr. 1990, 1260-1262, 63, 4.

H. Allcock et al., Polyphosphazenes Bearing Branched and Linear Oligoethyleneoxy Side Groups as Solid Solvents for Ionic Conduction, Macromolecules, Nov. 23, 1996, 7544-7552, 29.

F. Gray, Polymer Electrolytes, RSC Materials Monographs, UK, Jan. 1, 1997, 46-49.

J. Blackwell et al., B(C$_6$F$_5$)$_3$-Catalyzed Silation of Alcohols: A Mild, General Method for Synthesis for Silyl Ethers, Journal of Organic Chemistry, Jun. 9, 1999, 4887-4892, 64.

W. Xu et al., LiBOB and Its Derivatives Weakly Coordinating Anions, and the Exceptional Conductivity of Their Nonaqueous Solutions, Electrochemical and Solid-State Letters, 2001, E1-E4, 4(1).

W. Xu et al. Ionic Conductivity and Electrochemical Properties of Lithium Orthoborate Salts, http://www.electrochem.org/meetings/past/200/abstracts/symposia/bla/0107.pdf, United States, Sep. 5, 2001.

T. Fujii et al., Application of LiBOB as an Electrolyte Salt for 4 V Class Lithium Ion Rechargeable Cells, http://www2.electrochem.org/cgi-bin/abs?mtg=202&abs=0203, Oct. 24, 2002, United States.

W. Xu et al., Structures of Orthoborate Anions and Physical Properties of Their Lithium Salt Nonaqueous Solutions, Journal of the Electrochemical Society, 2003, 1-0, 150(1).

Z. Zhang et al., Cross-Linked Network Polymer Electrolytes Based on a Polysiloxane Backbone with Oligo(oxyethylene) Side Chains: Synthesis and Conductivity, Macromolecules, Oct. 28, 2003, vol. 36, No. 24, 9176-9180.

Y. Kang et al., Solid Polymer Electrolytes based on Cross-linked Siloxane-g-oligoethylene oxide: Ionic conductivity and Electrochemical Properties, Abstract book of 11th International Meeting on Lithium Batteries (IMLB 11), Jun. 23-28, 2002.

Y. Kang et al., Solid Polymer Electrolytes Based on Cross-Linked Polysiloxane-g-oligo(ethylene oxide): Ionic Conductivity and Electrochemical Properties, Journal of Power Sources 119-121 (Jun. 1, 2003). pp. 448-453.

\* cited by examiner

ELECTROLYTE FOR USE IN ELECTROCHEMICAL DEVICES

REFERENCE TO RELATED APPLICATIONS

This application claims priority to U.S. Provisional Patent application Ser. No. 60/543,951; filed on Feb. 11, 2004; entitled "Siloxanes" and incorporated herein in its entirety.

STATEMENT REGARDING FEDERALLY SPONSORED RESEARCH OR DEVELOPMENT

This invention was made with United States Government support under NIST ATP Award No. 70NANB043022 awarded by the National Institute of Standards and Technology (NIST). The United States Government has certain rights in this invention pursuant to NIST ATP Award No. 70NANB043022 and pursuant to Contract No. W-31-109-ENG-38 between the United States Government and the University of Chicago representing Argonne National Laboratory, and NIST 144 LM01, Subcontract No. AGT DTD Sep. 9, 2002.

FIELD

The present invention relates to electrolytes for electrochemical devices, and more particularly to electrolytes including polysiloxanes.

BACKGROUND

The increased demand for lithium batteries has resulted in research and development to improve the safety and performance of these batteries. Many batteries employ liquid electrolytes associated with high degrees of volatility, flammability, and chemical reactivity. A variety of polysiloxane based electrolytes have been developed to address these issues. However, polysiloxane based electrolytes typically have a low ionic conductivity that limits their use to applications that do not require high rate performance.

SUMMARY

An electrolyte for use in an electrochemical device is disclosed. The electrolyte includes one or more polysiloxanes, one or more alkali metal salts and one or more silanes.

A method of forming an electrochemical device is also disclosed. The method includes forming an electrolyte that includes one or more polysiloxanes, one or more alkali metal salts and one or more silanes. The method also includes activating at least one anode and at least one cathode with the electrolyte.

At least one polysiloxane in the electrolytes can includes side chains with poly(alkylene oxide) moieties. At least one silane in the electrolytes can include at least one substituent that includes a moiety selected from a first group consisting of an alkyl group, an aryl group, an alkoxy group, an alkylene oxide group or a poly(alkylene oxide) and at least one substituent that includes a moiety selected from a second group consisting of an alkoxy group, a carbonate group, an alkylene oxide group and a poly(alkylene oxide) group. The listed moieties in the first group and in the second group can be substituted or unsubstituted. In some instances, one or more of the moieties listed in the first group and/or one or more of the moieties listed in the second group is halogenated.

The electrolyte can include a network polymer that interacts with the polysiloxane and/or the silane to form an interpenetrating network. The network polymer can include a cross-linked polyacrylate or a cross-linked polymethacrylate.

In some instances, the electrolyte includes one or more solid polymers. The one or more solid polymers can include at least one component selected from the group consisting of: polyacrylonitrile (PAN), poly(methyl methacrylate) (PMMA), poly(vinylidene fluoride) (PVDF), poly(vinylidene fluoride-co-hexafluoropropylene), polystyrene, polyvinyl chloride, poly(alkyl methacrylate), poly(alkyl acrylate), styrene butadiene rubber (SBR), poly(vinyl acetate), poly(ethylene oxide) (PEO) and mixtures thereof.

DESCRIPTION

Figure 1A:
FIG. 1A illustrates a hydrosilylation reaction employed to generate a silane having one or more side chains that include a poly(ethylene oxide) moiety.

An electrolyte suitable for use in electrochemical devices is disclosed. The electrolyte includes a polysiloxane and a silane. The polysiloxane can have side chains that include poly(alkylene oxide) moieties that act as substrates for ion coordination and transportation. The inventors believe that the silane compounds improve the mobility of poly(siloxane-g-ethylene oxide) in the electrolyte. Additionally, the combination of the polysiloxane and the silane can have a high ability to dissociate the salts employed in battery electrolytes and can accordingly provide an electrolyte with a high concentrations of free ions. These features can provide an electrolyte with an increased ionic conductivity at room temperate. For instance, the combination can be employed to generate an electrolyte having an ionic conductivity higher than 1×10⁴ S/cm at about 25° C. and in some instances about 5×10⁻⁴ S/cm at 25° C.

Further, the silane can reduce the viscosity of the electrolyte. The reduced viscosity can improve wetting of electrodes in an electrochemical cell and can enhance the homogeneity of the electrolyte distribution in the cell. These electrolyte features can lead to increased capacity and enhanced cycling properties in batteries. As a result, the electrolytes can be suitable for use in batteries such as high-energy and long cycle life lithium secondary batteries, such as biomedical devices, electrical vehicles and satellite applications.

The electrolyte can be a liquid, a solid or a gel. For instance, the polysiloxanes are generally liquids at room temperature. As a result, the electrolyte can be a liquid. Further, the electrolyte can include a network polymer that interacts with the polysiloxane and/or the silane to form an interpenetrating network. An electrolyte that includes an interpenetrating network can be a solid or a gel. Accordingly, the interpenetrating network can serve as a mechanism for providing a solid or gel electrolyte. Alternately, the electrolyte can include one or more solid polymers in addition to the polysiloxane and the silane. Alternately, the electrolyte can include one or more solid polymers in addition to the polysiloxane. The one or more solid polymers are a solid when standing alone at room temperature. The solid polymer can be employed to generate a gel electrolyte or a solid electrolyte such as a plasticized electrolyte.

In some instances, the polysiloxane includes one or more side chains with carbonate moieties. The carbonate moieties can be cyclic carbonate moieties. The carbonate moiety can have a high ability to dissociate the salts employed in battery electrolytes. As a result the cyclic carbonates can enhance the concentrations of free ions in the electrolyte. In some instances, a portion of the polysiloxane side chains include a carbonate moiety and another portion of the polysiloxane side chains include a poly(alkylene oxide) moiety. The carbonates can provide high concentrations of free ions in the electrolyte and the poly(alkylene oxide) moieties can act as substrates for ion coordination and transportation. As a result, the poly (alkylene oxide) moiety and the poly(alkylene oxide) moiety can act together to enhance the ionic conductivity of the electrolyte.

Suitable polysiloxanes for use in the electrolyte can be cyclic or non-cyclic. One or more of the silicons in the polysiloxane backbone can be linked to one or more side chains that include a poly(alkylene oxide) moiety. In some instances, one or more of the silicons in the polysiloxane backbone are linked to a plurality of side chains that each include a poly (alkylene oxide) moiety. A suitable number of repeating units in the poly(alkylene oxide) moieties includes, but is not limited to, 2 to 15 repeating units. The poly(alkylene oxide) moieties can be attached directly to backbone silicons or a spacer can be positioned between the backbone silicons and the poly(alkylene oxide) moiety. In some instances, the spacers include an oxygen linked to the backbone silicons or the spacers include a carbon linked to the backbone silicons.

Examples of structures for polysiloxanes that are suitable for use in the electrolyte are presented in Formula I-a through Formula I-d. A suitable non-cyclic polysiloxane having backbone silicons linked to sidechains that include poly(ethylene oxide) moieties is represented by the following Formula I-a:

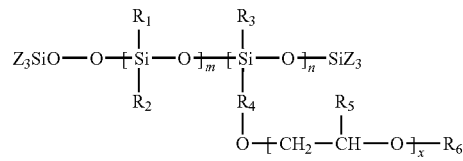

where $R_1$ is an alkyl group; $R_2$ is an alkyl group or an alkoxy group; $R_3$ is an alkyl group; $R_4$ is nil or a spacer; $R_5$ is a hydrogen atom or an alkyl group; $R_6$ is an alkyl group; Z is an alkyl or an aryl group and each Z can be the same or a portion of the Zs can be different; m is from 0 to 15; n is from 3 to 40; and x is from 2 to 15. The spacer can be an organic spacer and can include one or more —$CH_2$— groups. Other suitable spacers can include an alkylene, alkylene oxide or bivalent ether. These spacers can be substituted or unsubstituted. In one example, $R_4$ has a structure according to: $(CH_2)_3$— or —O—$(CH_2)_3$— with the oxygen linked to backbone silicon.

An example of a method for generating polysiloxanes according to Formula I-a includes dehydrogenation reactions between a polysiloxane precursor having main chain silicons bonded to hydrogen and a side chain precursor including a poly(alkylene oxide) moiety and a terminal —OH group in the presence of mild catalysts such as aryl borate, potassium carbonate, and metal carbonate based catalysts. Another example of a method for generating polysiloxanes according to Formula I-a include hydrosilylation between a polysiloxane precursor having main chain silicons bonded to hydrogen and an allyl terminated side chain precursor that includes a poly(alkylene oxide) moiety. An example of an allyl terminated side chain precursor includes an allyl terminated polyethylene glycol methyl ether. Additional methods for generating polysiloxanes according to Formula I-a also include, but are not limited to, the method disclosed in U.S. patent application Ser. No. 10/167,940, filed Jun. 12, 2002, entitled "Nonaqueous Liquid Electrolyte;" and in U.S. Provisional Patent Application Ser. No. 60/374,374, filed Apr. 22, 2002, and entitled "Cross-Linked Polysiloxanes;" and in U.S. patent application Ser. No. 10/367,013, filed Feb. 13, 2003, and entitled "Cross-Linked Polysiloxanes" each of which is incorporated herein in its entirety.

Examples of suitable non-cyclic polysiloxane having backbone silicons linked to a plurality of sidechains that include a poly(ethylene oxide) moiety is represented by the following Formula I-b:

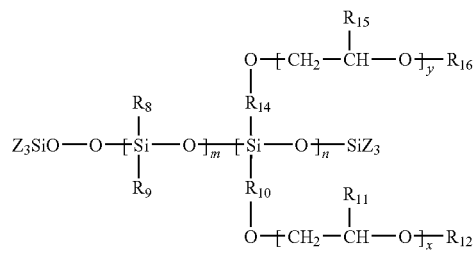

wherein $R_8$ is an alkyl group; $R_9$ is an alkyl group or an alkoxy group; $R_{10}$ is nil or a spacer; $R_{11}$ is a hydrogen or an alkyl group; $R_{12}$ is an alkyl group; $R_{14}$ is nil or a spacer; $R_{15}$ is a hydrogen or an alkyl group; $R_{16}$ is an alkyl group; Z is an alkyl or an aryl group and each Z can be the same or a portion of the Zs can be different; m is from 0 to 15; n is from 3 to 40; and x is from 2 to 15. The spacer can be an organic spacer and can include one or more —$CH_2$— groups. Other suitable spacers can include an alkylene, alkylene oxide or bivalent ether moiety. These spacers can be substituted or unsubstituted. In one example, $R_4$ has a structure according to: $(CH_2)_3$— or —O—$(CH_2)_3$— with the oxygen linked to backbone silicon.

An example of a suitable method for generating polysiloxanes according to Formula I-b includes dehydrogenation reactions between a polysiloxane precursor having main chain silicons bonded to two hydrogens and side chain precursors including a poly(alkylene oxide) moiety and a terminal —OH group in the presence of mild catalysts such as aryl borate, potassium carbonate, and metal carbonate based catalysts. Another example of a suitable method for generating polysiloxanes according to Formula I-b includes hydrosilylation between a polysiloxane precursor having main chain silicons bonded to two hydrogens and an allyl terminated side chain precursor that includes a poly(alkylene oxide) moiety. Additional methods for generating polysiloxanes according to Formula I-b also include, but are not limited to, the methods disclosed in U.S. Provisional Patent Application Ser. No. 60/374,374, filed Apr. 22, 2002 and entitled "Cross-Linked Polysiloxanes" and in U.S. patent application Ser. No. 10/367,013, filed Feb. 13, 2003 and entitled "Cross-Linked Polysiloxanes", each of which is incorporated herein in its entirety.

Examples of suitable cyclic polysiloxanes having backbone silicons that are each linked to a plurality of sidechains that include a poly(ethylene oxide) moiety is represented by the following Formula I-c:

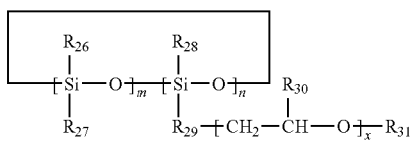

wherein, $R_{26}$ is an alkyl group; $R_{27}$ is an alkyl group or an alkoxy group; $R_{28}$ is an alkyl group; $R_{29}$ is an oxygen or a spacer; $R_{30}$ is a hydrogen atom or an alkyl group; $R_{31}$, is alkyl group; m is 0 or greater than 0; n is from 3 to 10; and x is from 2 to 15. The spacer can be an organic spacer and can include a hydrocarbon group having 1 to 10 carbons. Other suitable spacers can include an alkylene, alkylene oxide, alkylene dioxide or bivalent ether moiety. These spacers can be substituted or unsubstituted. In one example, $R_{29}$ has a structure according to: —O—$(CH_2)_3$— with the oxygen linked to the silicon.

An example of a suitable methods for generating polysiloxanes according to Formula I-c is a dehydrogenation reactions between a cyclic polysiloxane precursor having main chain silicons bonded to hydrogen and side chain precursors including a poly(alkylene oxide) moiety and a terminal —OH group in the presence of mild catalysts such as aryl borate, potassium carbonate, and metal carbonate based catalysts. Another example of a suitable methods for generating polysiloxanes according to Formula I-c is a hydrosilylation between a cyclic polysiloxane precursor having main chain silicons bonded to hydrogen and an allyl terminated side chain precursor that includes a poly(alkylene oxide) moiety. Additional methods for generating a polysiloxane having a structure according to Formula I-C include, but are not limited to, the methods disclosed in U.S. Provisional Patent Application Ser. No. 60/446,848, filed Feb. 11, 2003 and entitled "Polymer Electrolyte for Electrochemical Cell;" and in PCT application number PCT/US03/08779, filed Mar. 20, 2003 and entitled "Polymer Electrolyte for Electrochemical Cell;" and in U.S. patent application Ser. No. 10/663,024, filed Sep. 15, 2003 and entitled "Electrolyte for Electrochemical Cell," each of which is incorporated herein in its entirety.

Examples of suitable polysiloxane having one or more backbone silicons linked to a sidechain that includes a carbonate moiety is illustrated in Formula I-d:

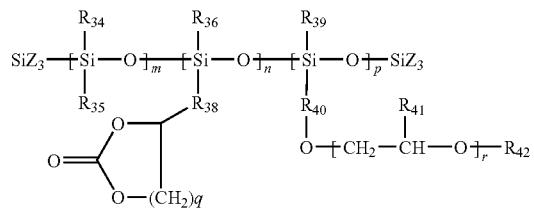

where, $R_{34}$ is an alkyl group; $R_{35}$ is an alkyl group or an alkoxy group; $R_{36}$ is an alkyl group; $R_{38}$ is nil an oxygen or a spacer; $R_{39}$ is an alkyl group; $R_{40}$ is nil or a spacer; $R_{41}$, is a hydrogen or an alkyl group; $R_{42}$ is an alkyl group; Z is an alkyl or an aryl group and each Z can be the same or a portion of the Zs can be different; m is 0 or greater than 0; n is 1 to 30; p is 0 or greater than 0; q is 1 or 2; r is 2 to 15. In some instances, m+n+p is 3 to 40. In one example m and p are 0. In instances where p is greater than 0, p+n can be 1 to 50 and a ratio of n:p can be 0.1 to 10. The spacers can be organic spacers that include one or more —$CH_2$— groups. Other examples of a suitable organic spacer include an alkylene, alkylene oxide, alkylene dioxide or bivalent ether moiety. These spacers can be substituted or unsubstituted. In one example, $R_{38}$ has a structure according to: —O—$(CH_2)_3$—O— or —$(CH_2)_3$—O— with the oxygen linked to the polyethylene oxide moiety. In another example, $R_{40}$ has a structure according to: —$CH_2$—O—$(CH_2)_3$— where the single —$CH_2$— group is positioned between the carbonate and the oxygen.

Suitable methods for generating a polysiloxane having a structure according to Formula I-d include, but are not limited to, the methods disclosed in Provisional U.S. Patent Application Ser. No. 60/502,017, filed on Sep. 10, 2003, entitled "Electrolyte Including Polysiloxane with Cyclic Carbonate Groups" and incorporated herein in its entirety.

The electrolyte can include two or more polysiloxanes. In some instances, the electrolyte includes two or more polysiloxanes chosen from those represented by Formulas I-a through Formulas I-d. For example, a first polysiloxane represented by Formula I-a may be used to keep the viscosity low and a second polysiloxane represented by Formula I-b may be used to enhance voltage stability of the electrolyte. As another example, a highly conductive polysiloxane may be combined with a low viscosity polysiloxane to improve wetting of electrodes, leading to increased capacity and enhanced cycling properties.

The electrolyte can include one or more silanes in addition to one or more polysiloxanes. Suitable silanes for use in an electrolyte can be substituted. In some instances, the silane includes four organic substituents. The silane can include at least one substituent that includes a moiety selected from a first group consisting of an alkyl group, an aryl group, an alkoxy group, an alkylene oxide group and a poly(alkylene oxide) and at least one substituent that includes a moiety selected from a second group consisting of an alkoxy group, a carbonate group, an alkylene oxide group and a poly(alkylene oxide) group. The moieties in the first group and in the second group can be substituted or unsubstituted. In some instances, the silane includes one or more substituents that include a halogenated moiety selected from the first group and the second group.

Examples of silanes that are suitable for use in the electrolyte are represented by the following Formula II-A through Formula II-C: Formula II-A:

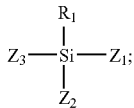

Formula II-B:

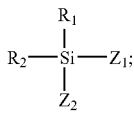

Formula II-C:

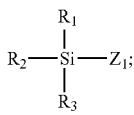

wherein, $R_1$ is an alkyl, a halogenated alkyl, aryl, halogenated aryl, an alkoxy, a halogenated alkoxy or is represented by Formula II-D; $R_2$ is an alkyl, a halogenated alkyl, aryl, halogenated aryl, an alkoxy, a halogenated alkoxy or is represented by Formula II-D; $R_3$ is an alkyl, a halogenated alkyl, aryl, halogenated aryl, an alkoxy, a halogenated alkoxy or is represented by Formula II-D; $Z_1$ is an alkoxy, a halogenated alkoxy, or is represented by Formula II-E or is represented by Formula II-F; $Z_2$ is an alkoxy, a halogenated alkoxy, or is represented by Formula II-E or is represented by Formula II-F; $Z_3$ is an alkoxy, a halogenated alkoxy, or is represented by Formula II-E or is represented by Formula II-F. In instances where more than one of $R_1$, $R_2$ and $R_3$ is represented by Formula II-D, the $R_1$, $R_2$ and $R_3$ represented by Formula II-D can be the same or different. In instances where more than one of $Z_1$, $Z_2$ and $Z_3$ is represented by Formula II-E, the $Z_1$, $Z_2$ and $Z_3$ represented by Formula II-E can be the same or different. In instances where more than one of $Z_1$, $Z_2$ and $Z_3$ is represented by Formula II-F, the $Z_1$, $Z_2$ and $Z_3$ represented by Formula II-F can be the same or different.

Formula II-D:

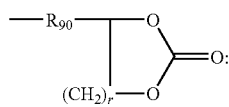

wherein $R_{90}$ is oxygen or an organic spacer and r is 1 or 2. Suitable organic spacers can include one or more —$CH_2$— groups. Other suitable spacers can include an alkylene, alkylene oxide or a bivalent ether group. These spacers can be substituted or unsubstituted. In one example, $R_{90}$ is represented by: —$CH_2$—O—$(CH_2)_3$— with the —$(CH_2)_3$— linked to the silicon.

Formula II-E:

wherein $R_{93}$ is oxygen or an organic spacer and q is 1 or 2. Suitable organic spacers can include one or more —$CH_2$— groups. Other suitable spacers can include an alkylene, alkylene oxide or a bivalent ether group. These spacers can be substituted or unsubstituted. In one example, $R_{93}$ is represented by: —$CH_2$—O—$(CH_2)_3$— with the —$(CH_2)_3$— is linked to a silicon.

Formula II-F:

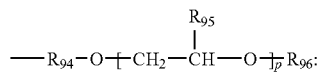

wherein $R_{94}$ is nil or an organic spacer; $R_{95}$ is hydrogen; alkyl or aryl; $R_{96}$ is alkyl or aryl; p is 1 to 12. Suitable organic spacers can include one or more —$CH_2$— groups. Other suitable spacers can include an alkylene, alkylene oxide or a bivalent ether group. These spacers can be substituted or unsubstituted. In one example, $R_{94}$ is represented by: —$(CH_2)_3$—.

The electrolyte can include a single silane. Alternately, the electrolyte can include two or more silanes. In some instances, at least one of the two or more silanes is chosen from those represented by Formula II-A through Formula II-C. Alternately, each of the silanes can be chosen from those represented by Formula II-A through Formula II-C.

The electrolyte can be prepared by combining one or more polysiloxanes and one or more of the silanes. The electrolyte can be prepared such that the content of silane relative to polysiloxane is about 0.5 wt % to 50 wt % but more preferably 20 wt % to 40 wt %. In some instances, one or more salts are dissolved in the resulting combination. Alternately, one or more salts can be dissolved in one or more of the polysiloxanes and/or one or more of the silanes before combining. Where the electrolyte is to be solidified or gelled, the salt is preferably dissolved in the electrolyte before solidification or gelling of the electrolyte. The concentration of the salt in the electrolytes can be about 0.3 to 2.0 M, about 0.5 to 1.5 M, or about 0.7 to 1.2 M. Suitable salts for use with the electrolyte include, but are not limited to, alkali metal salts including lithium salts. Examples of specific lithium salts include $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates, lithium bis(chelato)borates including lithium bis(oxalato)borate (LiBOB), as well as other lithium bis(chelato) borates having five to seven membered rings, $LiPF_3(C_2F_5)_3$, $LiPF_3(CF_3)_3$, and mixtures thereof.

When a lithium salt is used with the electrolyte, an [EO]/[Li] ratio can be used to characterize the salt in the electrolyte. [EO] is the molar concentration in the electrolyte of the ethylene oxides in the electrolyte. Because [EO] is directed to ethylene oxides, there are at least x ethylene oxides in the Formulas I-a and Formulas I-c side chains while the side chains linked to the p silicons of Formulas I-d include at least r ethylene oxides. In some instances, the spacers will also include ethylene oxides. For instance, a side chain according to Formula I-a has x+1 ethylene oxides when $R_4$ is $—(CH_2)_3—$ but x ethylene oxides when $R_4$ is nil. The electrolyte is preferably prepared so as to have a [EO]/[Li] ratio of 5 to 50. When the [EO]/[Li] ratio is larger than 50, the ionic conductivity of the resulting polymeric electrolyte can become undesirably low because few carrier ions are in the solid polymer electrolyte. When the [EO]/[Li] ratio is smaller than 5, the lithium salt is not sufficiently dissociated in the resulting polymeric electrolyte and the aggregation of lithium ions can confine the ionic conductivity.

In some instances, the electrolyte is generated so as to include one or more additives. In some instances, one or more additives are added to the combination of the polysiloxane and the silane. Alternately, the one or more additives can be dissolved in one or more of the polysiloxanes and/or one or more of the silanes before combining. Additives can serve a variety of different functions. For instance, additives can enhance the ionic conductivity and/or enhance the voltage stability of the electrolyte. A preferred additive forms a passivation layer on one or more electrodes in an electrochemical device such as a battery or a capacitor. The passivation layer can enhance the cycling capabilities of the electrochemical device. In one example, the passivation layer is formed by reduction of the additive at the surface of an electrode that includes carbon. In another example, the additive forms a polymer on the surface of an electrode that includes carbon. The polymer layer can serve as the passivation layer.

Suitable additives include, but are not limited to, carbonates, sulfur compounds, unsaturated hydrocarbons and nitrogen compounds. In some instances, the electrolyte includes at least one additive selected from the group consisting of: vinyl carbonate (VC), vinyl ethylene carbonate (VEC), ethylene sulfite, 1,3 dimethyl butadiene, styrene carbonate, aromatic carbonates, vinyl pyrrole, vinyl piperazine, vinyl piperidine, vinyl pyridine, and mixtures thereof. In one example, the electrolyte includes vinyl ethylene carbonate as an additive. VC is an example of an additive that can be reduced to form a passivation layer that includes a carbonate at the surface of an electrode that includes carbon. Pyridine is an example of an additive that can form a polymeric passivation layer at the surface of an electrode that includes carbon. VEC is an example of an additive that can form a passivation layer by both being reduced and forming a polymer at the surface of an electrode that includes carbon. A suitable concentration for an additive in the electrolyte includes, but is not limited to, concentrations greater than 0.1 wt %, greater than 0.5 wt % and/or less than 5 wt % or less than 20 wt %.

A preferred embodiment of the electrolyte includes one or more of the siloxanes, one or more of the silanes, a lithium (oxalato)borate (LiBOB) salt and one or more additives selected from a group consisting of VC and VEC.

The electrolyte can include a network polymer that interacts with the one or more of the polysiloxanes and/or one or more of the silanes to form an interpenetrating network. An electrolyte having an interpenetrating network can be generated by polymerizing and/or cross-linking one or more network polymers in the presence of the polysiloxane and the silane. Alternately, an electrolyte having an interpenetrating network can be generated by polymerizing the polysiloxane in the presence of one or more network polymers. Alternately, an electrolyte having an interpenetrating network can be generated by polymerizing and/or cross-linking one or more network polymers and polymerizing the polysiloxane in the presence of one another.

Suitable network monomers from which the network polymer can be formed include, but are not limited to, acrylates and methacrylates. Acrylates and/or methacrylates having one or more functionalities can form a polyacrylate and/or a polymethacrylate network polymer. Acrylates and/or methacrylates having two or more functionalities can both polymerize and cross-link to form a cross-linked polyacrylate network polymer and/or to form a cross-linked polymethacrylate network polymer. In some instances, acrylates and/or methacrylates having four or more functionalities are a preferred network monomer. Suitable acrylates include, but are not limited to, poly(alkylene glycol) dialkyl acrylate. Suitable methacrylates include, but are not limited to, poly(alkylene glycol) dialkyl methacrylate.

A suitable network monomer is represented by the following Formula III:

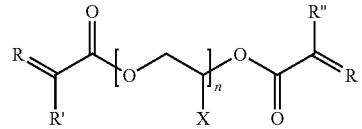

wherein: R is an alkylidene, a carbene, or is represented by CR'''R'''' and each R can be the same or different; R' represents hydrogen or an alkyl group having 1 to 10 carbon atoms or an alkenyl group having 2 to 12 carbon atoms; R'' represents hydrogen or an alkyl group having 1 to 10 carbon atoms or an alkenyl group having 2 to 12 carbon atoms; R''' represents hydrogen or an alkyl group having 1 to 10 carbon atoms; R'''' represents hydrogen or an alkyl group having 1 to 10 carbon atoms; X is hydrogen or a methyl group; and n represents a numeral of 1 to 15.

When a monomer that cross-links is employed to form a cross-linked network polymer, a control monomer can be employed to control cross-linking density. A suitable control monomer for use with a network monomer according to Formula III is represented by the following Formula IV:

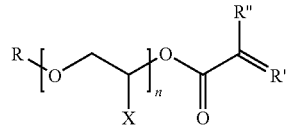

wherein: R is an alkyl group having 1 to 10 carbon atoms; R' is an alkylidene, a carbene, or is represented by CR'''R'''' is represented by =CR''' R''''; R'' is hydrogen or an alkyl group having 1 to 10 carbon atoms or an alkenyl group having 2 to 12 carbon atoms; R''' represents hydrogen or an alkyl group having 1 to 10 carbon atoms; R'''' represents hydrogen or an alkyl group having 1 to 10 carbon atoms; X is hydrogen or a methyl group; and n represents a whole number from 1 to 20. During formation of the network polymer, the illustrated control monomer serves as a co-monomer with the network monomers according to Formula III. Because the control monomer does not cross link, increasing the amount of control monomer present during formation of the network polymer can reduce the density of cross linking.

Diallyl terminated compounds can also be employed as a network monomer. Diallyl terminated compounds having two or more functionalities can polymerize and cross-link to form the network polymer. An example of a diallyl terminated compound having two functionalities that allow the compound to polymerize and cross link is represented by Formula V.

Formula V:

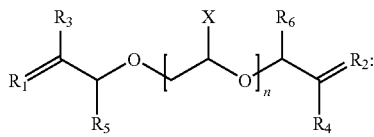

wherein $R_1$ represents an alkylidene, a carbene, or $CR'''R''''$, $R_2$ represents an alkylidene, a carbene, or $CR'''R''''$; $R_3$ represents hydrogen or an alkyl group having 1 to 10 carbon atoms or an alkenyl group having 2 to 12 carbon atoms; $R_4$ represents hydrogen or an alkyl group having 1 to 10 carbon atoms or an alkenyl group having 2 to 12 carbon atoms; $R_5$ represents hydrogen or an alkyl group having 1 to 10 carbon atoms or an alkenyl group having 2 to 12 carbon atoms; $R_6$ represents hydrogen or an alkyl group having 1 to 10 carbon atoms or an alkenyl group having 2 to 12 carbon atoms; $R'''$ represents hydrogen or an alkyl group having 1 to 10 carbon atoms; $R''''$ represents hydrogen or an alkyl group having 1 to 10 carbon atoms; X is hydrogen or a methyl group; and n represents a numeral of 1 to 15.

Formula VI represents an example of a control monomer for controlling the cross linking density of a compound represented by Formula V.

Formula VI:

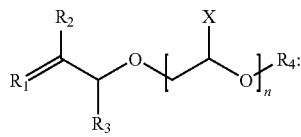

wherein $R_1$ represents an alkylidene, a carbene, or is represented by $CR'''R''''$; $R_2$ represents hydrogen or an alkyl group having 1 to 10 carbon atoms or an alkenyl group having 2 to 12 carbon atoms; $R_3$ represents hydrogen or an alkyl group having 1 to 10 carbon atoms or an alkenyl group having 2 to 12 carbon atoms; $R_4$ represents hydrogen or an alkyl group having 1 to 10 carbon atoms or an alkenyl group having 2 to 12 carbon atoms; $R'''$ represents hydrogen or an alkyl group having 1 to 10 carbon atoms; $R''''$ represents hydrogen or an alkyl group having 1 to 10 carbon atoms; X is hydrogen or a methyl group; and n represents a numeral of 1 to 15.

A diallyl terminated compound suitable for serving as a network monomer can include more than two functionalities. For instance, the oxygens shown in Formula III can be replaced with $CH_2$ groups to provide a diallyl terminated compound having four functionalities that allow the compound to polymerize and cross link. Further, the oxygens shown in Formula IV can be replaced with $CH_2$ groups to provide an example of a control monomer for controlling the cross linking density of the diallyl terminated compound. Other suitable diallyl terminated compounds for serving as a network monomer include, but are not limited to, poly(alkylene glycol) diallyl ethers. A specific example includes, but is not limited to, tetra(ethylene glycol) diallyl ether.

An electrolyte that includes an interpenetrating network can be formed by generating a precursor solution that includes the one or more polysiloxanes, one or more silanes, the monomers for forming the cross-linked network polymer and one or more salts. The precursor solution can also optionally be generated so as to include one or more radical initiators and/or one or more additives. Suitable radical initiators include, but are not limited to, thermal initiators including azo compounds such as azoisobutyronitrile, peroxide compounds such as benzoylperoxide, and bismaleimide. A control monomer can also optionally be added to the precursor solution to control the cross-linking density of the network monomer. The monomers are cross-linked and/or polymerized to form the electrolyte. In some instance, the temperature of the precursor solution is elevated and/or the precursor solution is exposed to UV to form the electrolyte. The resulting electrolyte can be a liquid, solid or gel. The physical state of the electrolyte can depend on the ratio of the components in the precursor solution.

An electrolyte having an interpenetrating network can also be generated from a polymer and a cross-linking agent for cross linking of the polymer. For instance, a diallyl terminated compound can serve as a cross linking agent for a polysiloxane having a backbone that includes one or more silicons linked to a hydrogen. Examples of suitable diallyl terminated cross-linking agents include, but are not limited to, diallyl-terminated polysiloxanes, diallyl terminated polysiloxanes, diallyl terminated alkylene glycols and diallyl terminated poly(alkylene glycol)s.

The electrolyte can be generated by preparing a precursor solution that includes the polymer, the cross linking agent, the one or more polysiloxanes, the one or more silanes and one or more salts. The precursor solution can also optionally be generated so as to include one or more catalysts, and/or one or more additives. Suitable catalysts include, but are not limited to, platinum catalysts such as Karstedt's catalyst and $H_2PtCl_6$. In some instances, an inhibitor is added to the precursor solution to slow the cross-linking reaction enough to permit handling prior to viscosity changing. Suitable inhibitors include, but are not limited to, dibutyl maleate. The polymer is cross-linked to form the electrolyte. In some instances, heat and/or UV energy is also applied to the precursor solution during the reaction of the cross linking precursor and the cross-linking agent.

A network polymer suitable for the interpenetrating network can be formed using other precursors. For instance, the network polymer can be generated from a mixture of monomers and cross-linking agents that are different from one another. The monomers can polymerize and the cross-linking agents can provide cross linking of the resulting polymer. Other examples of methods for generating electrolytes and electrochemical devices that include network polymers are described in U.S. patent application Ser. No. 10/104,352, filed on Mar. 22, 2002, entitled "Solid Polymer Electrolyte and Method of Preparation" and incorporated herein by reference in its entirety.

As noted above, the electrolyte can include one or more solid polymers in addition to one or more polysiloxanes and one or more silanes. The solid polymers are each a solid when standing alone at room temperature. As a result, the ratio of solid polymer to the other electrolyte components can be selected so as to provide an electrolyte that is a solid at room temperature. A suitable solid polymer is an aprotic polar polymer or aprotic rubbery polymer. Examples of suitable solid polymers include, but are not limited to, polyacrylonitrile (PAN), poly(methyl methacrylate) (PMMA), poly(vinylidene fluoride) (PVDF), poly(vinylidene fluoride-cohexafluoropropylene), polystyrene, polyvinyl chloride, poly(alkyl methacrylate), poly(alkyl acrylate), styrene butadiene rubber (SBR), poly(vinyl acetate), poly(ethylene oxide) (PEO) and mixtures thereof.

The electrolyte can be generated by preparing a precursor solution that includes one or more of the polysiloxanes, one or more silanes and a solution that includes a solid polymer. The solution can be generated by dissolving the solid polymer in a solvent such as N-methylpyrrolidone (NMP), dimethyl formamide, dimethyl acetamide, tetrahydrofuran, acetonitrile, and/or water. One or more additives can be optionally added to the precursor solution. One or more salts can be added to the precursor solution or the salt can be dissolved in a component of the precursor solution before adding the component to the precursor solution. A solid electrolyte can be formed by evaporating the solvent from the precursor solution.

An electrolyte that includes one or more solid polymers can also be generated by polymerizing a solid polymer in the presence of the polysiloxane and silane. For instance, a precursor solution can be generated so as to include one or more polysiloxanes, one or more silanes, monomers for the solid polymer and a radical initiator. Suitable radical initiators include, but are not limited to, thermal initiators including azo compounds such as azoisobutyronitrile, peroxide compounds such as benzoylperoxide, and bismaleimide. The precursor solution can optionally be prepared so as to include one or more additives. One or more salts can be added to the precursor solution or the salt can be dissolved in a component of the precursor solution before adding the component to the precursor solution. The electrolyte can be formed by polymerizing the monomers. As an example, an acrylonitrile monomers can be mixed with the polysiloxane and silane. The acrylonitrile monomers can be polymerized by the application of heat and/or UV to form an electrolyte having a polyacrylonitrile solid polymer.

As is evident from the above discussion, the electrolyte can include components in addition to the one or more polysiloxanes and one or more silanes. For instance, the electrolyte can include salts, additives, network polymers and/or solids polymers. In some instances, the electrolyte is generated such that the polysiloxanes plus the silanes together make are more than 20 wt % of the electrolyte, more than 50 wt % of the electrolyte, more than 80 wt % of the electrolyte or more than 95 wt % of the electrolyte.

A hydrosilylation reaction between a precursor silane and side chain precursors can be employed to generate a silane having one or more side chains with a poly(alkylene oxide) moiety or one or more side chains with a carbonate moiety. The precursor silane has one or more hydrogens linked to the silicon(s) where the side chains are desired. The side chain precursor is allyl terminated. The side chain precursors also include a poly(alkylene oxide) moiety or a carbonate moiety.

For the purposes of illustration, FIG. 1A illustrates a hydrosilylation reaction employed to generate a silane having one or more side chains that include a poly(ethylene oxide) moiety. A precursor silane having a silicon linked to a hydrogen is labeled A. The hydrogen is linked to the silicon where the side chain is desired. An allyl terminated side chain precursor that include a poly(ethylene oxide) moiety is labeled B. The product silane labeled C includes a side chain with a poly(ethylene oxide) moiety.

Figure 1B:
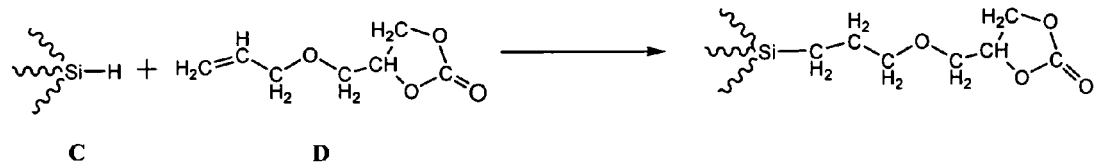
FIG. 1B illustrates a hydrosilylation reaction employed to generate a silane having one or more side chains that include a cyclic carbonate moiety.

For the purposes of illustration, FIG. 1B illustrates a hydrosilylation reaction employed to generate a silane having one or more side chains that include a cyclic carbonate moiety. A precursor silane having a silicon linked to a hydrogen is labeled D. The hydrogen is linked to the silicon where the side chain is desired. An allyl terminated side chain precursor that includes a cyclic carbonate moiety is labeled E. The product silane labeled F includes a side chain with a cyclic carbonate moiety.

When the desired silane has one or more side chains that include a poly(ethylene oxide) moiety, a precursor solution is generated that includes the precursor silane labeled A and the side chain precursor labeled B. When the desired silane has one or more side chains that include a carbonate moiety, a precursor solution is generated that includes the precursor silane labeled D and the side chain precursor labeled E. In some instances, a reaction solvent is added to the precursor solution. A suitable solvent includes, but is not limited to, toluene, THF, and benzene. A catalyst can be added to the precursor solution to catalyze the hydrosilylation reaction. Suitable catalysts for use in the precursor solution include, but are not limited to, platinum catalysts such as Karstedt's catalyst (divinyltetramethyldisiloxane (Pt(dvs)), dicyclopentadiene platinum(II) dichloride, $H_2PtCl_6$. In some instances, heat is applied to the precursor solution to react the components of the precursor solution. The reaction can be continued until the Si—H groups are no longer evident on an FTIR spectrum. The product solution can be distilled to remove any unreacted side-chain precursors and/or reaction solvent. In some instances, the product is decolorized and/or purified by distillation. The product can be decolorized by activated charcoal in refluxing toluene. The product can be purified by distillation using a long vacuum-jacketed Vigreux column and/or by sequentially performing two or more regular distillations. The regular distillations can be vacuum distillations. When a sequence of two or more regular distillations is performed, a central fraction of the distillate can be used as the product for each distillation step.

The silanes can also be generated using a dehydrogenation reaction between a precursor silane and side-chain precursors. The precursor silane has one or more hydrogens linked to the silicon(s) where the side chain(s) are desired. A suitable side chain precursor includes a terminal —OH group. The side chain precursor also includes a poly(alkylene oxide) moiety or a cyclic carbonate moiety.

Figure 2A:
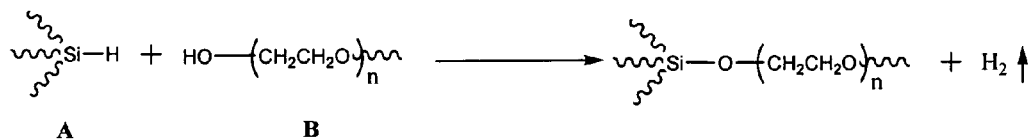
FIG. 2A illustrates a dehydrogenation reaction employed to generate a silane having one or more side chains that include a poly(ethylene oxide) moiety.

For the purposes of illustration, FIG. 2A illustrates a dehydrogenation reaction employed to generate a silane having one or more side chains that include a poly(ethylene oxide) moiety. A precursor silane having at least one silicon linked to a hydrogen is labeled A. The hydrogen is linked to a silicon where a side chain is desired. An —OH terminated side chain precursor that include a poly(ethylene oxide) moiety is labeled B. The product silane labeled C includes a side chain with a poly(ethylene oxide) moiety.

Figure 2B:
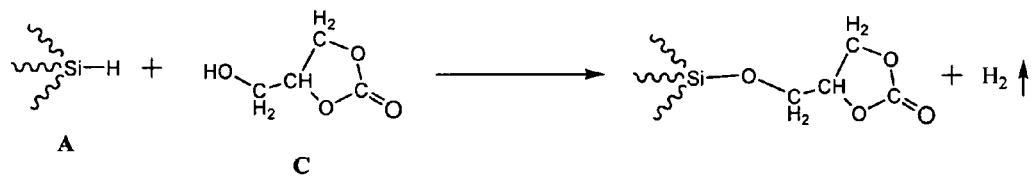
FIG. 2B illustrates a dehydrogenation reaction employed to generate a silane having one or more side chains that include a cyclic carbonate moiety.

For the purposes of illustration, FIG. 2B illustrates a dehydrogenation reaction employed to generate a silane having one or more side chains that include a carbonate moiety. A precursor silane having at least one silicon linked to a hydrogen is labeled D. The hydrogen is linked to a silicon where a side chain is desired. An —OH terminated side chain precursor that include a cyclic carbonate moiety is labeled E. The product silane labeled F includes a side chain with a cyclic carbonate moiety.

When the desired silane has one or more side chains that include a poly(ethylene oxide) moiety, a precursor solution is generated that includes the precursor silane labeled A and the side chain precursor labeled B in FIG. 2A. When the desired silane has one or more side chains that include a carbonate moiety, a precursor solution is generated that includes the precursor silane labeled D and the side chain precursor labeled E in FIG. 2B.

In some instances, a reaction solvent is added to the precursor solution of FIG. 2. A suitable solvent includes, but is not limited to, Toluene. In some instances, a catalyst is added to the precursor solution to catalyze the dehydrogenation reaction. Suitable catalysts for use in the precursor solution include, but are not limited to, $B(C_6F_5)_3$, $K_2CO_3$, $N(C_2H_5)_3$, Rhodium catalyst $(Rh(Ph_3P)_3Cl)$ and/or Palladium catalyst $(Pd_2(dba)_3)$. In some instances, heat is applied to the precursor solution to react the components of the precursor solution. The reaction can be continued until the Si—H groups are no longer evident on an NMR spectrum. The product solution can be distilled to remove any unreacted side-chain precursors and/or reaction solvent. In some instances, the product is decolorized and/or purified by distillation. The product can be decolorized by activated charcoal in refluxing toluene. The product can be purified by distillation using a long vacuum-jacketed Vigreux column and/or by sequentially performing two or more regular distillations. The regular distillations can be vacuum distillations. When a sequence of two or more regular distillations is performed, a central fraction of the distillate can be used as the product for each distillation step.

Example 1

Figure 3A:
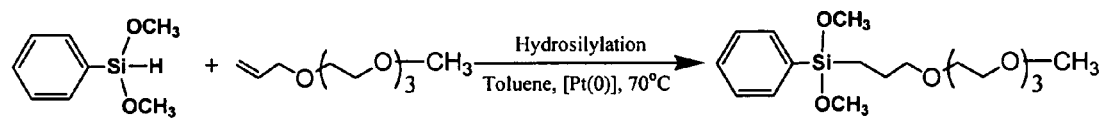
FIG. 3A illustrates the of FIG. 1A employed to generate a dimethoxyphenylsilane with a tri(ethylene oxide) group.

The method of FIG. 1A could be employed to generate a silane according to Formula II-A wherein $R_1$ is a phenyl; $Z_1$ and $Z_2$ are each represented by —$OCH_3$; $Z_3$ is represented by Formula II-F; $R_{95}$ is hydrogen; $R_{96}$ is methyl; $R_{94}$ is represented by: —$(CH_2)_3$—; and p is 3. The method is illustrated in FIG. 3A. A hydrosilylation could be performed with stoichiometric amounts of dimethoxyphenylsilane(Gelest Inc.) and 3-(2-methoxyethoxy)prop-1-ene (Aldrich Chem. Co.) in the presence of excess Toluene as a solvent and ca. 150 ppm of Pt(0) (3% in xylene solution, Aldrich Chem. Co.) catalyst at 70° C.

Example 2

Figure 3B:
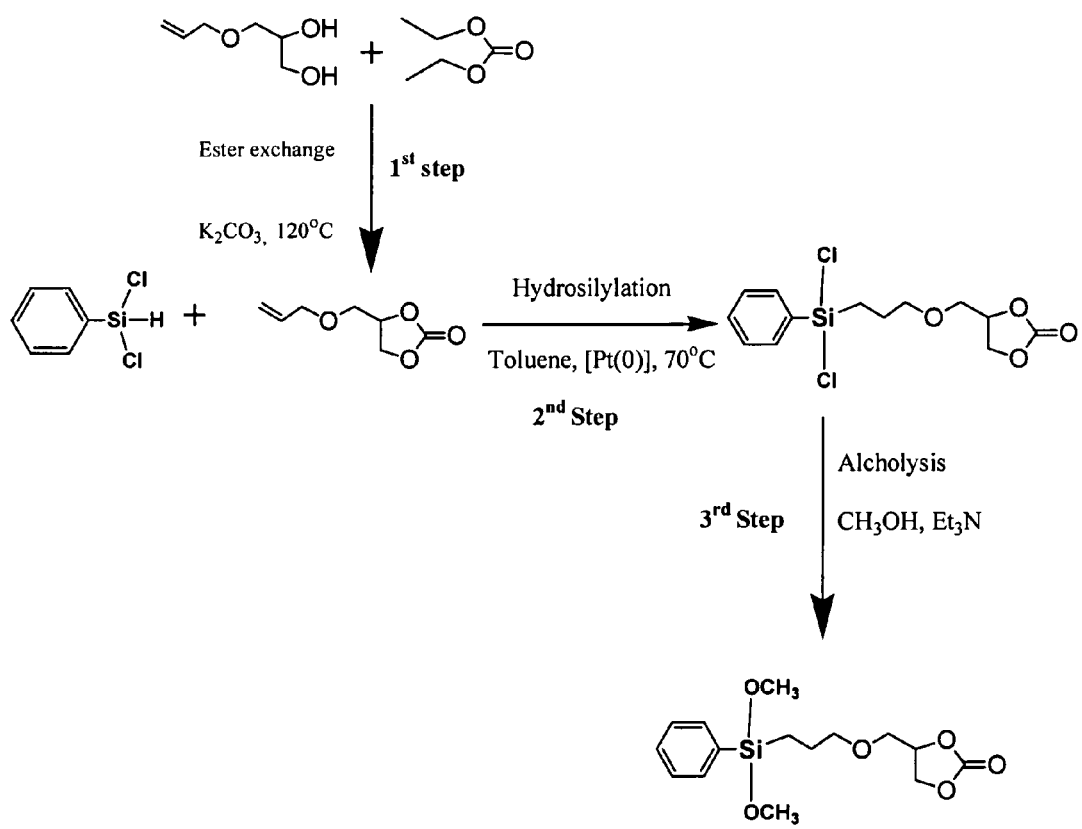
FIG. 3B illustrates the method of FIG. 1B employed to generate a dimethoxyphenylsilane with a cyclic carbonate group.

The method of FIG. 1B could be employed to generate a silane according to Formula II-B wherein $Z_1$ and $Z_2$ are each represented by —$OCH_3$; $R_1$ is an aryl group; $R_2$ is represented by Formula II-D; r is 1; and $R_{90}$ is represented by —$CH_2$—O—$(CH_2)_3$— with the —$(CH_2)_3$— linked to the silicon. The method is illustrated in FIG. 3B. An ester exchange was performed with 0.76 mol of 3-(allyoxy)propane-1,2-diol (Aldrich Chem. Co.) and 2.27 mol of diethyl carbonate (Aldrich Chem. Co.) in the presence of 0.13 mol of $K_2CO_3$ catalyst at 120° C. to generate ca. 59 g of 4-((allyoxy)methyl)-1,3-dioxolan-2-one. Distillation was done at 81-82° C./0.03 mmHg to purify the product. A hydrosilylation reaction could be employed with stoichiometric amounts of the 4-((allyloxy)methyl)-1,3-dioxolan-2-one and dichlorophenylsilane (Gelest Inc.) in the presence of Pt(0) at 70° C. to generate 4-((3-(dichloro(phenyl)silyl)propoxy)methyl)-1,3-dioxolan-2-one at 70° C. $CH_3CN$ (Acetonitrile) could be used as a solvent for this reaction. An alcoholysis could be performed on the 4-((3-(dichloro(phenyl)silyl)propoxy)methyl)-1,3-dioxolan-2-one in the presence of methanol and triethylamine to produce a silane compound with a cyclic carbonate.

Example 3

Figure 4:
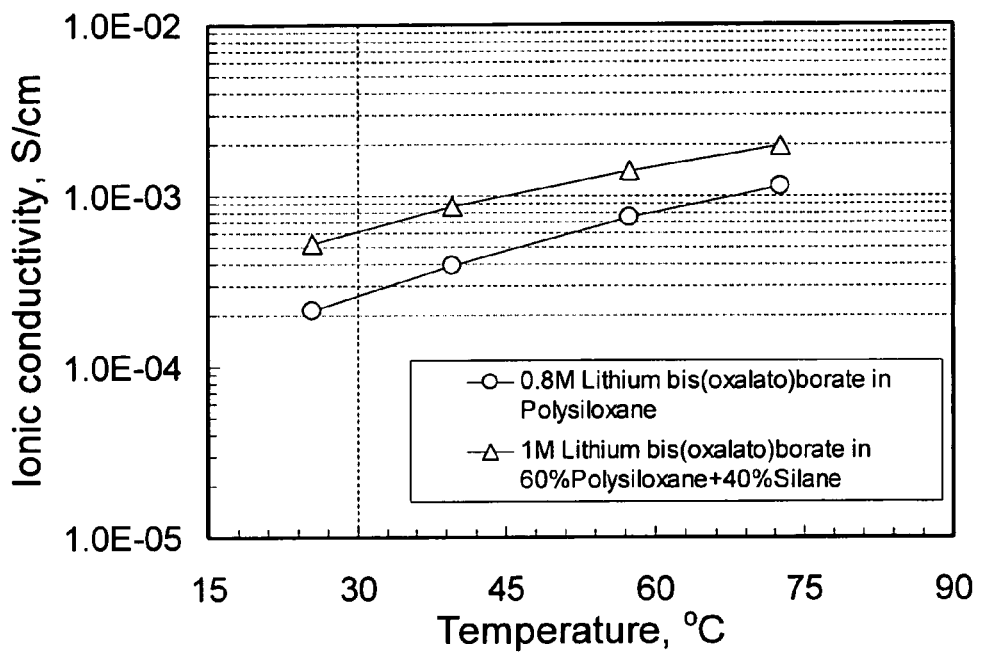
FIG. 4 shows ionic conductivity versus temperature for an electrolyte that includes a polysiloxane and a silane and for an electrolyte that includes only the polysiloxane.

FIG. 4 shows the effect of temperature on the ionic conductivity of an embodiment of the electrolyte. The electrolyte includes 60 wt % of a poly(siloxane-g-ethylene oxide) and 40 wt % of a silane. The polysiloxane has a structure according to Formula VII with 75% of ethylene oxide Mw=ca. 600 and was obtained from Gelest. The silane has a structure according to Formula VIII (Gelest Inc.). The electrolyte included Lithium bis(oxalate)borate (LiBOB, Chemetall) dissolved to 1.0 molal concentration. The ionic conductivity of the electrolytes were measured at temperatures ranging from 25 to 75° C. from the ac impedance curves of 2032 button cells assembled by injecting the polymer electrolyte between two stainless steel discs with Teflon O-ring as a spacer to prevent short circuit. The measurement frequency range was from 500 kHz to 100 Hz. FIG. 4 compares the results with an electrolyte having LiBOB dissolved in the poly(siloxane-g-ethylene oxide) alone. The LiBOB was solubility limited to 0.8-M. It is believed that, although a silane itself shows low conductivity, the silane increased the mobility of the poly (siloxane-g-ethylene oxide). The increased mobility appears to have more than doubled the ionic conductivity of the polysiloxane.

Formula VII:

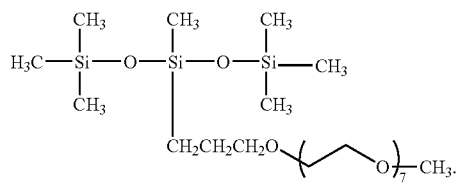

Formula VIII:

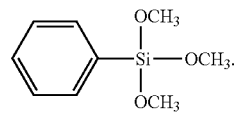

Example 4

FIG. 4 shows the effect of temperature on the ionic conductivity of an embodiment of the electrolyte. The electrolyte includes 60 wt % of a polysiloxane 20 wt % of a silane and 20 wt % of vinyl ethylene carbonate (Aldrich Chem.). The polysiloxane has a structure according to Formula VII with 75% of ethylene oxide and Mw=ca. 600. The silane has a structure according to Formula VIII. LiBOB was dissolved in 1.0 molal concentration. The ionic conductivity of the electrolytes were measured at temperatures ranging from 25 to 75° C. from the ac impedance curves of 2032 button cells assembled by injecting the polymer electrolyte between two stainless steel discs with Teflon O-ring as a spacer to prevent short circuit. The measurement frequency range was from 500 kHz to 100 Hz. This electrolyte composition shows excellent ionic conductivity of above $10^{-3}$ S/cm at 37° C.

Example 5

A solid electrolyte could be prepared so as to include the polysiloxane and the silane of Example 1 entrapped in a network polymer generated from a network forming agent such as poly(alkylene glycol) dimethacrylate. A precursor solution would be prepared by mixing the polysiloxane and the silane, a poly(ethylene glycol) dimethacrylate, a control monomer, benzoyl peroxide, and $LiN(SO_2CF_3)_2$ (LiTFSI) or LiBOB salt. A solid electrolyte could be formed by curing the precursor solution at 70° C. for 2 hrs. This procedure is modeled after the interpenetrating polymerization technique described in detail in U.S. patent application Ser. No. 10/104, 352, filed on Mar. 22, 2002, entitled "Solid Polymer Electrolyte and Method of Preparation" and incorporated herein by reference in its entirety.

Example 6

Figure 6:
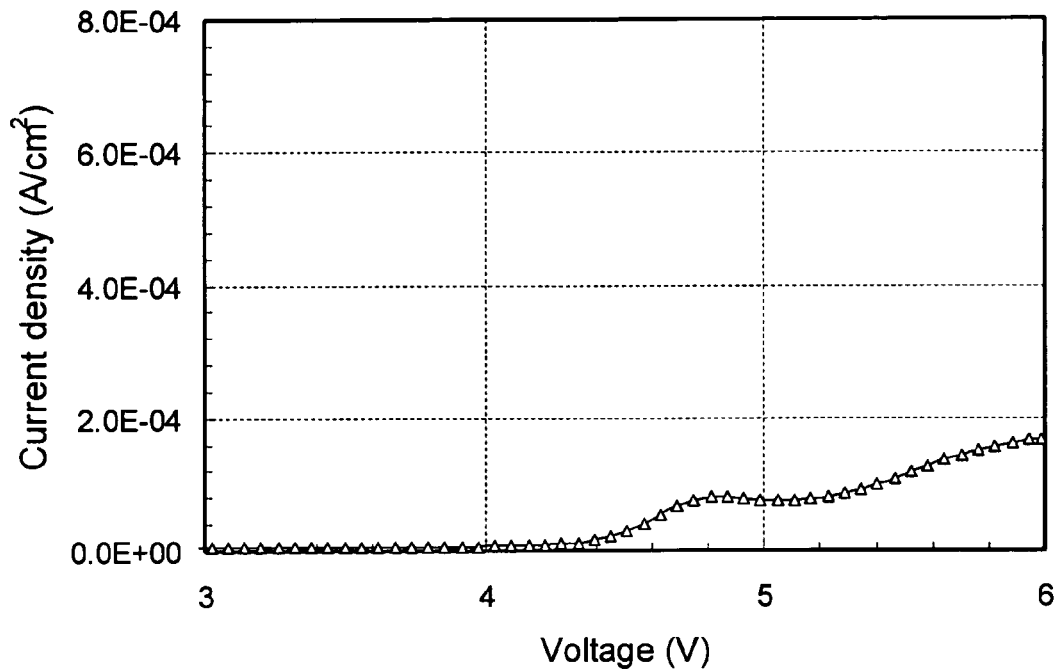
FIG. 6 shows the current density versus voltage for an electrolyte that includes a polysiloxane and a silane.

FIG. 6 shows the electrochemical stability of the electrolyte of example 1. The electrochemical stability window of the electrolytes were determined by cyclic voltammetry with 2032 button cell assembled by sandwiching the liquid polymer electrolyte between a stainless steel disc as a working electrode and lithium metal disc as counter and reference electrodes (two electrodes method. Porous polypropylene membrane used as a separator. The electrolyte was stable above 4.5 V.

Example 7

Figure 7:
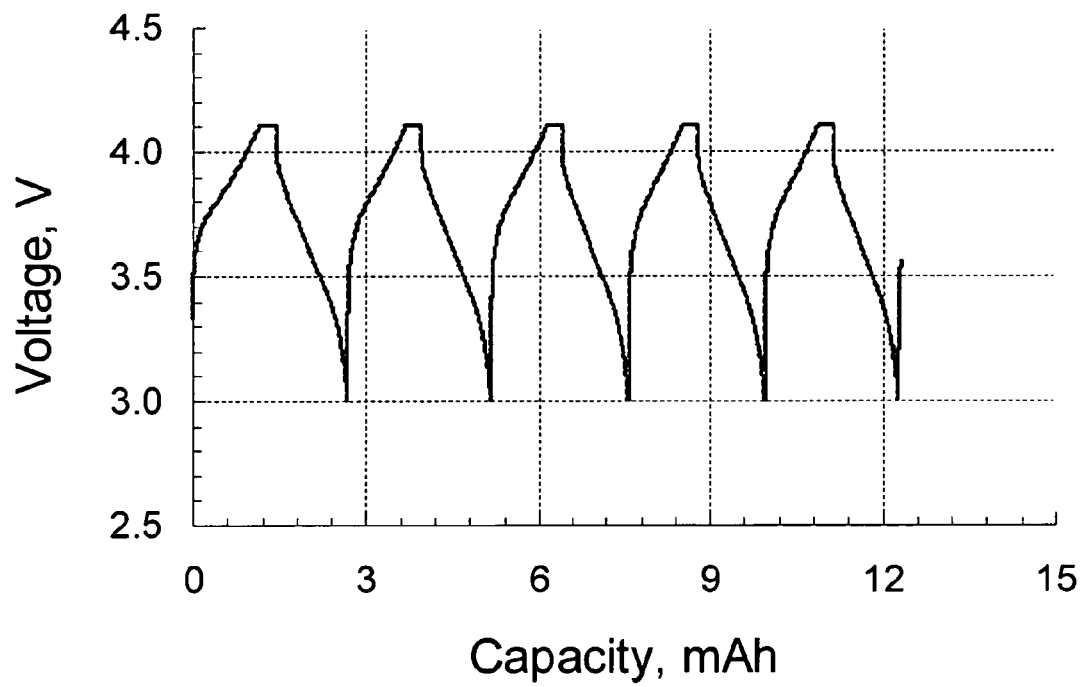
FIG. 7 shows the cycle performance of a cell comprising 1.0-M lithium bis(oxalate)borate in 60 wt % polysiloxane and 40 wt % silane.

FIG. 7 shows the cycle performance of a 2032 button type cell comprising the components listed in Table 1. The cell includes an electrolyte lithium bis(trifluoromethane sulfonyl)imide dissolved to 1.0-M in a mixture of 60 wt % polysiloxane and 40 wt % silane. The polysiloxane has a structure according to Formula VII and the silane has a structure according to Formula VIII. The electrolyte shows a viscosity less than 13 cPs, which could distribute the electrolyte homogeneously in the cell. The cell cycled well at C/10 rate, as shown in FIG. 7. In contrast, an electrolyte having lithium bis(trifluoromethane sulfonyl)imide dissolved to 0.8-M in the poly(siloxane-g-ethylene oxide) has a viscosity of 45 cPs, which is too high for homogeneous distribution of the electrolyte inside electrodes. Accordingly, it is believed that the addition of silane to the electrolyte provides a viscosity reduction that helps the penetration of the polysiloxane electrolyte into electrodes due to the improved wetting property.

| Component | Composition |
| --- | --- |
| Positive electrode | 84 wt % LiNiCoAlO<br>8 wt % PVDF<br>4 wt % Graphite<br>4 wt % carbon black |
| Electrolyte | 1.0-M lithium bis(oxalate)borate in<br>60 wt % poly(siloxane-g-ethylene oxide)<br>40 wt % silane |
| Separator | polypropylene |
| Negative electrode | 92 wt % MAG-10 graphite<br>8 wt % PVDF |

Example 6

Figure 5:
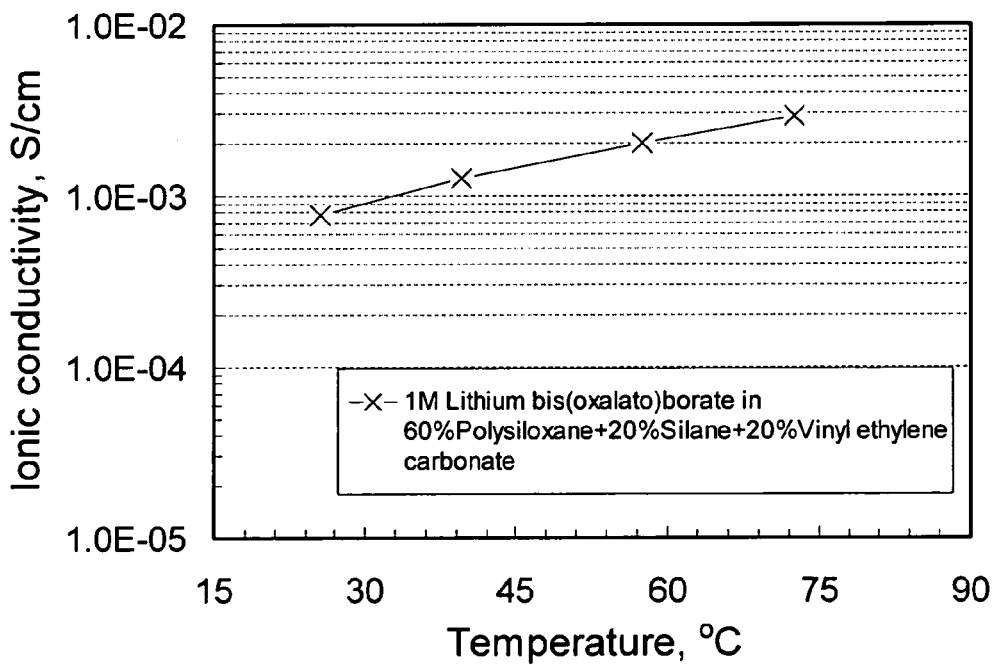
FIG. 5 shows ionic conductivity versus temperature for an electrolyte that includes a polysiloxane, a silane and an additive.
Figure 8:
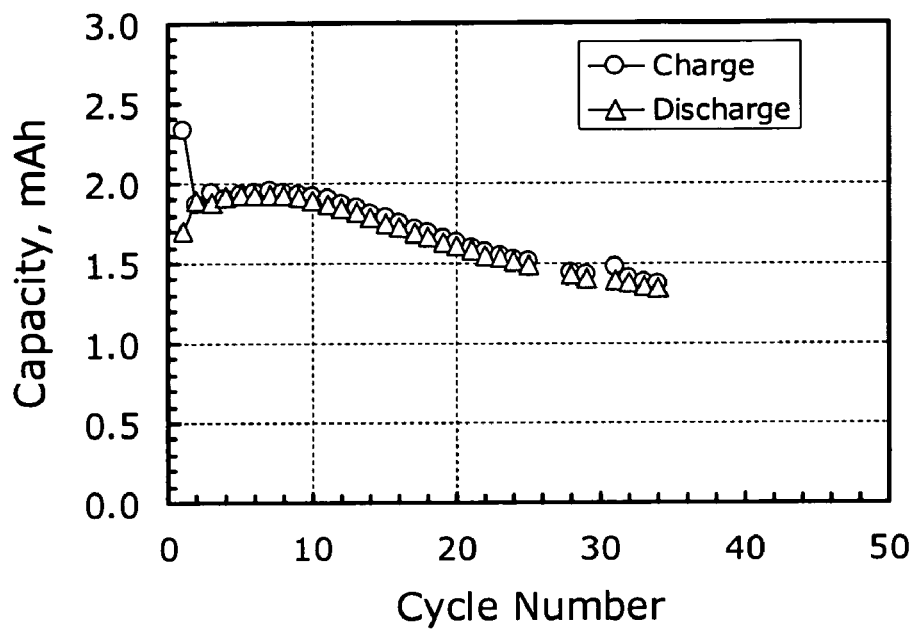
FIG. 8 shows the cycle performance at C/10 of a 2032 button type cell. The cell includes lithium bis(oxalato)borate dissolved to 0.8M in a mixture of 60 wt % polysiloxane and 40 wt % silane.

FIG. 8 shows the cycle performance at C/10 of a 2032 button type cell including the positive electrode and separator listed in Table 1. MCMB graphite was used as a negative electrode instead of MAG-10 graphite. The composition of the anode was 92 wt % MCMB and 8 wt % PVDF. The electrolyte included lithium bis(oxalato)borate dissolved to 0.8M in a mixture of 60 wt % polysiloxane and 40 wt % silane. The polysiloxane has a structure according to Formula VII and the silane has a structure according to Formula VIII. The cell with this electrolyte cycled well with good cell capacity at C/10 rate, as shown in FIG. 5. The cycle performance was done at 37° C.

Example 8

Figure 9:
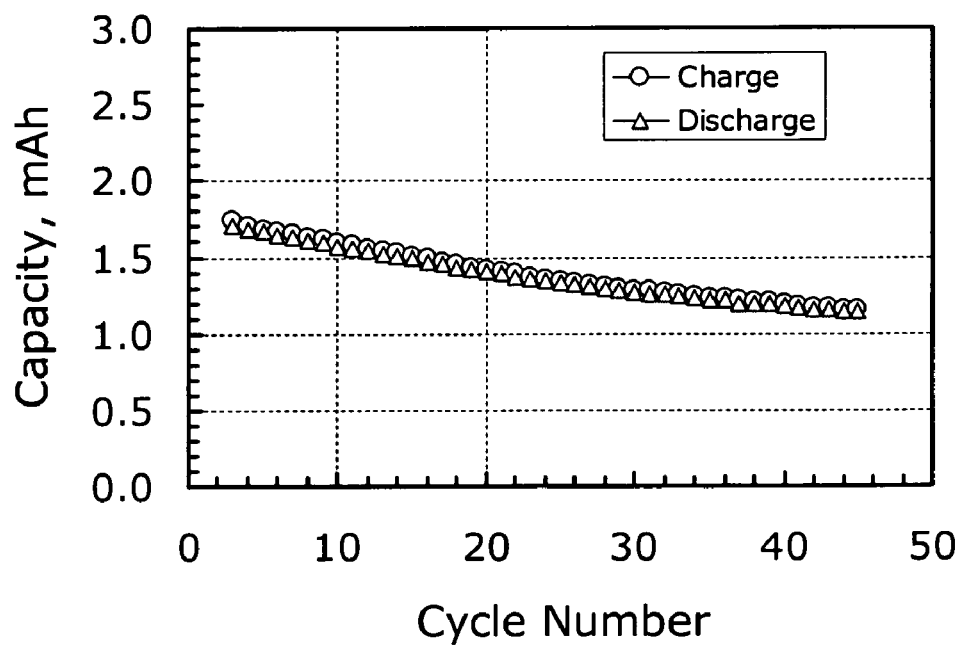
FIG. 9 shows the cycle performance at C/5 of a 2032 button type cell. The cell includes lithium bis(oxalato)borate dissolved to 0.8M in a mixture of 60 wt % polysiloxane and 40 wt % silane.

FIG. 9 shows the cycle performance at C/5 of a 2032 button type cell comprising the positive electrode and separator listed in Table 1. MCMB graphite was used as a negative electrode instead of MAG-10 graphite. The composition of the anode was 92 wt % MCMB and 8 wt % PVDF. The electrolyte included lithium bis(oxalato)borate dissolved to 0.8M in a mixture of 60 wt % polysiloxane and 40 wt % silane. The polysiloxane has a structure according to Formula VII and the silane has a structure according to Formula VIII. The cell with this electrolyte cycled well even at higher current rate than C/10 rate, as shown in FIG. 6. The cycle performance was done at 37° C.

The electrolytes described above can be used in electrochemical devices. For instance, the electrolytes can be used as the electrolyte of batteries, capacitors, and hybrid capacitor/batteries. As an example, the electrolyte can be applied to batteries in the same way as carbonate-based electrolytes. Batteries with a liquid electrolyte can be fabricated by injecting the electrolyte into a spiral wound cell or prismatic type cell. The electrolyte can be also coated onto the surface of electrodes and assembled with a porous separator to fabricate a single or multi-stacked cell that can enable the use of flexible packaging.

The solid and/or gel electrolytes described above can also be applied to electrochemical devices in the same way as solid carbonate-based electrolytes. For instance, a precursor solution having components for a solid electrolyte can be applied to one or more substrates. Suitable substrates include, but are not limited to, anodes, cathodes and/or separators such as a polyolefin separator, nonwoven separator or polycarbonate separator. The precursor solution is converted to a solid or gel electrolyte such that a film of the electrolyte is present on the one or more substrates. In some instances, the substrate is heated to solidify the electrolyte on the substrate. An electrochemical cell can be formed by positioning a separator between an anode and a cathode such that the electrolyte contacts the anode and the cathode.

An example of a suitable lithium battery construction includes one or more lithium metal oxide cathodes, one or more porous separators, and one or more anodes made of carbon, lithium metal, or combinations thereof. Cathodes may include $Li_xVO_y$, $LiCoO_2$, $LiNiO_2$, $LiNi_{1-x}Co_yMe_zO_2$, $LiMn_{0.5}Ni_{0.5}O_2$, $LiMn_{0.3}Co_{0.3}Ni_{0.3}O_2$, $LiFePO_4$, $LiMn_2O_4$, $LiFeO_2$, $LiMc_{0.5}Mn_{1.5}O_4$, vanadium oxide, carbon fluoride and combinations thereof. Me is Al, Mg, Ti, B, Ga, Si, Mn, or Zn, and combinations thereof. Mc is a divalent metal such as Ni, Co, Fe, Cr, Cu and combinations thereof. Anodes may include graphite, soft carbon, hard carbon, $Li_4Ti_5O_{12}$, tin alloys, silica alloys, intermetallic compounds, lithium metal, lithium metal alloys, and combinations thereof.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An electrochemical device, comprising:
    an electrolyte including one or more polysiloxanes, one or more alkali metal salts, and one or more silanes,
    the silane and the polysiloxane being included in different compounds, and
    the silane including at least one substituent that includes a poly(alkylene oxide) moiety.

2. The device of claim 1, wherein at least one polysiloxane is cyclic.

3. The device of claim 1, wherein at least one polysiloxane has a backbone that includes one or more silicons linked to one or more side chains that include a poly(alkylene oxide) moiety.

4. The device of claim 3 wherein the backbone includes one or more silicons linked to one or more side chains that include a carbonate moiety.

5. The device of claim 3, wherein one or more of the backbone silicons are linked to a plurality of side chains that each include a poly(alkylene oxide) moiety.

6. The device of claim 3, wherein an organic spacer is positioned between the backbone silicons and the poly(alkylene oxide) moiety.

7. The device of claim 6, wherein the spacer includes oxygen linked directly to the backbone silicons.

8. The device of claim 1, wherein the silane includes at least one substituent that includes a moiety selected from a second group consisting of an alkoxy group, a carbonate group, and an alkylene oxide group.

9. The device of claim 1, wherein at least one polysiloxane has a structure selected from a group consisting of structures represented by formula I-a through formula I-d:

formula I-a:

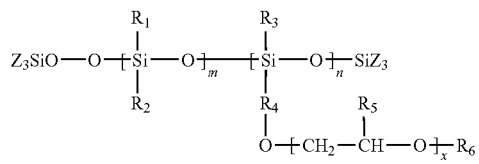

where $R_1$ is an alkyl group, $R_2$ is an alkyl group or an alkoxy group, $R_3$ is an alkyl group, $R_4$ is nil or an organic spacer, $R_5$ is a hydrogen atom or an alkyl group, and $R_6$ are alkyl groups, Z is an alkyl or an aryl group, m is from 0 to 15, n is from 1 to 30, x is from 2 to 15;

formula I-b:

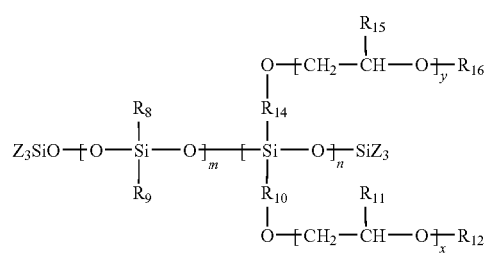

wherein $R_9$ is an alkyl group, $R_9$ is an alkyl group or an alkoxy group, $R_{10}$ is nil or an organic spacer, $R_{11}$ is a hydrogen or an alkyl group, $R_{12}$ is an alkyl group, $R_{14}$ is nil or an organic spacer, $R_{15}$ is a hydrogen or an alkyl group, $R_{16}$ is an alkyl group, Z is an alkyl or an aryl group, m is from 0 to 15, n is from 1 to 30, x is from 2 to 15; and formula I-c:

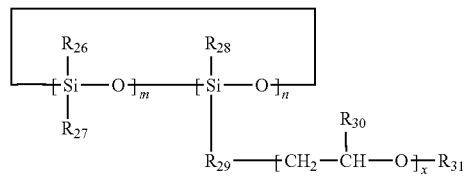

wherein, $R_{26}$ is an alkyl group, $R_{27}$ is an alkyl group or an alkoxy group, $R_{28}$ is an alkyl group, $R_{29}$ is an oxygen or an organic spacer, $R_{30}$ is a hydrogen atom or an alkyl group, $R_{31}$ is alkyl group, m is 0 or greater than 0, n is from 3 to 10, and x is from 2 to 15; and formula I-d:

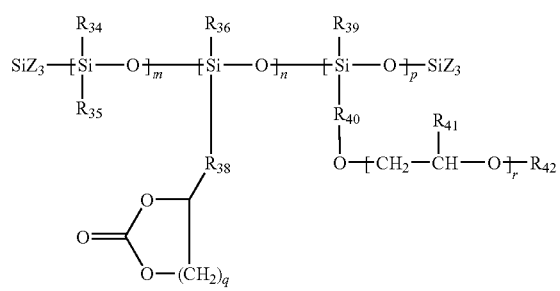

where, $R_{34}$ is an alkyl group; $R_{35}$ is an alkyl group or an alkoxy group; $R_{36}$ is an alkyl group; $R_{38}$ is nil an oxygen or an organic spacer; $R_{39}$ is an alkyl group; $R_{40}$ is an organic spacer; $R_{41}$ is a hydrogen or an alkyl group; $R_{42}$ is an alkyl group; Z is an alkyl or an aryl group; m is 0 or greater than 0; n is 1 to 30; p is greater than 0; q is 1 or 2; r is 2 to 15.

10. The device of claim 9, wherein m is 0.

11. The device of claim 9, wherein $R_4$, $R_{10}$, $R_{14}$, $R_{29}$, $R_{38}$ and $R_{40}$, are nil.

12. The device of claim 9, wherein $R_4$, $R_{10}$, $R_{14}$, $R_{20}$, and $R_{38}$ are an organic spacer.

13. The device of claim 9 wherein the polysiloxane is represented by formula I-d and the organic spacer represented by $R_{40}$ includes an oxygen linked directly to a silicon on the backbone of the polysiloxane.

14. The device of claim 9, wherein at least one polysiloxane has a structure selected from the group consisting of structures represented by formula I-a.

15. The device of claim 9, wherein at least one polysiloxane has a structure selected from the group consisting of structures represented by formula I-b.

16. The device of claim 9, wherein at least one polysiloxane has a structure selected from the group consisting of structures represented by formula I-c.

17. The device of claim 9, wherein at least one polysiloxane has a structure selected from the group consisting of structures represented by formula I-d.

18. The device of claim 17, wherein p is 0.

19. The device of claim 1, wherein at least one silane has a structure selected from a group consisting of structures represented by formula II-a through formula I'-c;
formula II-A:

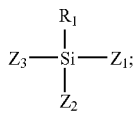

formula II-B:

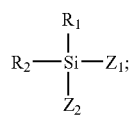

formula II-C:

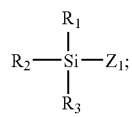

wherein, $R_1$ is an alkyl, aryl, an alkoxy, or is represented by formula II-D; $R_2$ is an alkyl, aryl, an alkoxy or is represented by formula II-D; $R_3$ is an alkyl, aryl, an alkoxy, or is represented by formula II-D; $Z_1$ is represented by formula II-F; $Z_2$ is an alkoxy, is represented by formula II-E or is represented by formula II-F; $Z_3$ is an alkoxy, is represented by formula II-E or is represented by formula II-F;
formula II-D:

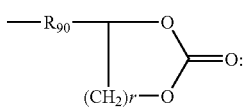

wherein $R_{90}$ is oxygen or an organic spacer and r is 1 or 2;
formula II-E:

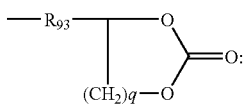

wherein $R_{93}$ is oxygen or an organic spacer and q is 1 or 2;
formula II-F:

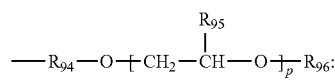

wherein $R_{94}$ is nil or an organic spacer; $R_{95}$ is hydrogen; alkyl or aryl; $R_{96}$ is alkyl or aryl; p is 1 to 12.

20. The device of claim 19, wherein at least one silane has a structure selected from a group consisting of structures represented by formula II-a.

21. The device of claim 19, wherein at least one silane has a stricture selected from a group consisting of structures represented by formula II-b.

22. The device of claim 19, wherein at least one silane has a structure selected from a group consisting of structures represented by formula II-c.

23. The device of claim 19, wherein at least one of the $R_1$, $R_2$, $R_3$, $Z_1$ $Z_2$, and $Z_3$ includes an organic spacer, the organic spacer being an alkylene, alkylene oxide or a bivalent ether group.

24. The device of claim 19, wherein at least one of the $R_1$, $R_2$, $R_3$ includes a halogenated alkyl, a halogenated aryl or a halogenated alkoxy.

25. The device of claim 1, wherein the salt is a lithium salt.

26. The device of claim 1, wherein the concentration of alkali metal salt is about 0.3 to 2.0 M.

27. The device of claim 1, wherein the salt is chosen from the group consisting of: $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates, lithium bis(chelato)borates, and mixtures thereof.

28. The device of claim 1, wherein the electrolyte further includes:
at least one additive selected from the group consisting of: vinyl carbonate, vinyl ethylene carbonate, ethylene sulfite, 1,3 dimethyl butadiene, styrene carbonate, aromatic carbonates, vinyl pyrrole, vinyl piperazine, vinyl piperidine, vinyl pyridine, and mixtures thereof.

29. The device of claim 1, wherein the electrolyte includes a lithium(oxalato)borate (LiBOB) salt and one or more additives selected from a group consisting of VC and VEC.

30. The device of claim 1, wherein the device is lithium secondary battery comprising:
a lithium metal oxide cathode;
a porous separator; and
a carbon or lithium metal anode.

31. The device of claim 30, wherein the cathode includes a material chosen from the group consisting of: $Li_xVO_y$, $LiCoO_2$, $LiNiO_2$, $LiNi_{1-x}Co_yMe_zO_2$, $LiMn_{0.5}Ni_{0.5}O_2$, $LiMn_{0.3}Co_{0.3}Ni_{0.3}O_2$, $LiFePO_4$, $LiMn_2O_4$, $LiFeO_2$, $LiMc_{0.5}Mn_{1.5}O_4$, vanadium oxide, and mixtures thereof, wherein Me is Al, Mg, Ti, B, Ga, or Si, and Mc is a divalent metal.

32. The device of claim 30, wherein the anode includes a material chosen from the group consisting of: graphite, carbon, $Li_4Ti_5O_{12}$, tin alloys, silica alloys, intermetallic compounds, lithium metal, and mixtures thereof.

33. The device of claim 1, wherein the electrolyte is a liquid.

34. The device of claim 1, wherein the electrolyte is a solid.

35. The device of claim 1, wherein the electrolyte includes an interpenetrating network.

36. The device of claim 35, wherein the interpenetrating network includes a cross-linked polyacrylates or a cross-linked polymethacrylates.

37. The device of claim 35, wherein a compound selected from the group consisting of an acrylate having two or more functionalities and a methacrylates having two or more functionalities serves as a monomer for a member of the interpenetrating network.

38. The device of claim 37, wherein the monomer is a dialkyl acrylate, dimethacrylate, a diallyl terminated compound or a dialkyl methacrylate.

39. The device of claim 37, wherein the electrolyte includes one or more solid polymers.

40. The device of claim 39, wherein at least one of the solid polymers is selected from the group consisting of polyacrylonitrile (PAN), poly(methyl methacrylate) (PMMA), poly(vinylidene fluoride) (PVDF), poly(vinylidene fluoride-co-hexafluoropropylene), polystyrene, polyvinyl chloride, poly(alkyl methacrylate), poly(alkyl acrylate), styrene butadiene rubber (SBR), poly(vinyl acetate), poly(ethylene oxide) (PEO) and mixtures thereof.

41. The device of claim 1, wherein the electrolyte has an ionic conductivity greater than $1.0 \times 10^{-4}$ S/cm at 25° C.

42. The device of claim 1, wherein the electrolyte has an ionic conductivity greater than $4.0 \times 10^{4}$ S/cm at 25° C.

43. A method of forming an electrochemical device, comprising:
forming an electrolyte including one or more polysiloxanes, one or more alkali metal salts, and one or more silanes,
the silane and the polysiloxane being included in different compounds, and
the silane including at least one substituent that includes a poly(alkylene oxide) moiety; and
activating at least one anode and at least one cathode with the electrolyte.

44. The method of claim 43, wherein at least one polysiloxane is cyclic.

45. The method of claim 43, wherein at least one polysiloxane has a backbone that includes one or more silicons linked to one or more side chains that include a poly(alkylene oxide) moiety.

46. The method of claim 45, wherein one or more of the backbone silicons are linked to a plurality of side chains that each include a poly(alkylene oxide) moiety.

47. The method of claim 45, wherein an organic spacer is positioned between the backbone silicons and the poly(alkylene oxide) moiety.

48. The method of claim 45, wherein the spacer includes an oxygen linked to the backbone silicons.

49. The method of claim 43, wherein the silane includes at least one substituent that includes a moiety selected from a first group consisting of an alkyl group, a halogenated alkyl group, an aryl group, a halogenated aryl group, an alkoxy group and an oxyalkylene group and at least one substituent that includes a moiety selected from a second group consisting of an alkoxy group, an oxyalkylene group or a cyclic carbonate group.

50. The method of claim 49, wherein the silane includes four substituents that each includes a moiety selected from the first group or from the second group.

51. The method of claim 43, wherein at least one polysiloxane has a structure selected from a group consisting of structures represented by formula I-a through formula I-d:
formula I-a:

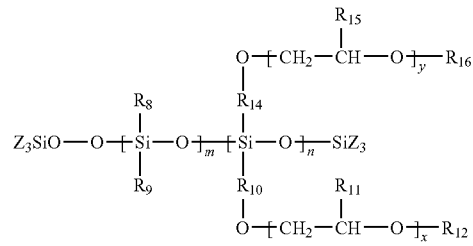

where $R_1$ is an alkyl group, $R_2$ is an alkyl group or an alkoxy group, $R_3$ is an alkyl group, $R_4$ is nil or an organic spacer, $R_5$ is a hydrogen atom or an alkyl group, and $R_6$ are alkyl groups, Z is an alkyl or an aryl group, m is from 0 to 15, n is from 1 to 30, x is from 2 to 15;
formula I-b:

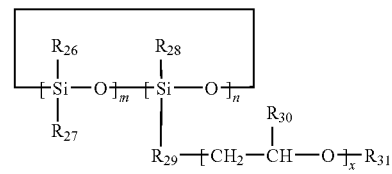

wherein $R_8$ is an alkyl group, $R_9$ is an alkyl group or an alkoxy group, $R_{10}$ is nil or an organic spacer, $R_{11}$ is a hydrogen or an alkyl group, $R_{12}$ is an alkyl group, $R_{14}$ is nil or an organic spacer, $R_{15}$ is a hydrogen or an alkyl group, $R_{16}$ is an alkyl group, Z is an alkyl or an aryl group, m is from 0 to 15, n is from 1 to 30, x is from 2 to 15; and
formula I-c:

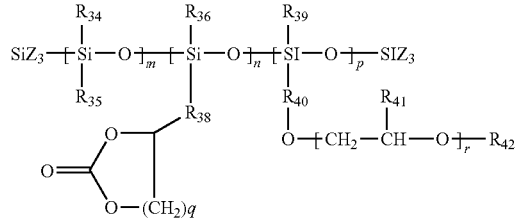

wherein, $R_{26}$ is an alkyl group, $R_{27}$ is an alkyl group or an alkoxy group, $R_{28}$ is an alkyl group, $R_{29}$ is an oxygen or an organic spacer, $R_{30}$ is a hydrogen atom or an alkyl group, $R_{31}$ is alkyl group, m is 0 or greater than 0, n is from 3 to 10, and x is from 2 to 15; and
formula I-d:

where, $R_{34}$ is an alkyl group; $R_{35}$ is an alkyl group or an alkoxy group; $R_{36}$ is an alkyl group; $R_{38}$ is nil an oxygen or an organic spacer; $R_{39}$ is an alkyl group; $R_{40}$ is nil or an organic spacer; $R_{41}$ is a hydrogen or an alkyl group; $R_{42}$ is an alkyl group; Z is an alkyl or an aryl group; m is 0 or greater than 0; n is 1 to 30; p is 0 or greater than 0; q is 1 or 2; r is 2 to 15.

52. The method of claim 51, wherein m is 0.

53. The method of claim 51, wherein $R_4$, $R_{10}$, $R1_{14}$, $R_{29}$, $R_{38}$ and $R_{40}$, are nil.

54. The method of claim 51, wherein $R_4$, $R_{10}$, $R1_{14}$, $R_{29}$, $R_{36}$ and $R_{40}$, are an organic spacer.

55. The method of claim 54, wherein the organic spacer includes an oxygen linked to a silicon on the backbone of the polysiloxane.

56. The method of claim 51, wherein at least one polysiloxane has a structure selected from the group consisting of structures represented by formula I-a.

57. The method of claim 51, wherein at least one polysiloxane has a structure selected from the group consisting of structures represented by formula I-b.

58. The method of claim 51, wherein at least one polysiloxane has a structure selected from the group consisting of structures represented by formula I-c.

59. The method of claim 51, wherein at least one polysiloxane has a structure selected from the group consisting of structures represented by formula I-d.

60. The method of claim 59, wherein p is 0.

61. The method of claim 43, wherein at least one silane is selected from a group represented by formula II-a through formula II-c:

formula II-A:

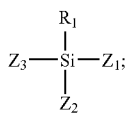

formula II-B:

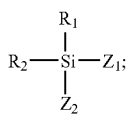

formula II-C:

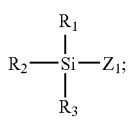

wherein, $R_1$ is an alkyl, aryl, an alkoxy, or is represented by formula II-D; $R_2$ is an alkyl, aryl, an alkoxy or is represented by formula II-D; $R_3$ is an alkyl, aryl, an alkoxy, or is represented by formula II-D; $Z_1$ is an alkoxy, is represented by formula II-E or is represented by formula II-F; $Z_2$ is an alkoxy, is represented by formula II-E or is represented by formula II-F; $Z_3$ is an alkoxy, is represented by formula II-E or is represented by formula II-F;

formula II-D:

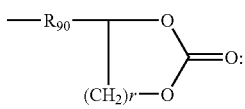

wherein $R_{90}$ is oxygen or an organic spacer and r is 1 or 2;

formula II-E:

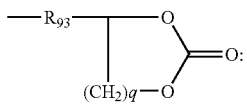

wherein $R_{93}$ is oxygen or an organic spacer and q is 1 or 2, and formula II-F:

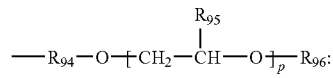

wherein $R_{94}$ is nil or an organic spacer; $R_{95}$ is hydrogen; alkyl or aryl; $R_{96}$ is alkyl or aryl and p is 1 to 12.

62. The method of claim 61, wherein at least one silane has a structure selected from a group consisting of structures represented by formula II-a.

63. The method of claim 61, wherein at least one silane has a structure selected from a group consisting of structures represented by formula II-b.

64. The method of claim 61, wherein at least one silane has a structure selected from a group consisting of structures represented by formula II-c.

65. The method of claim 43, wherein the electrolyte includes at least one additive selected from the group consisting of: vinyl carbonate, vinyl ethylene carbonate, ethylene sulfite, 1,3 dimethyl butadiene, styrene carbonate, aromatic carbonates, vinyl pyrrole, vinyl piperazine, vinyl piperidine, vinyl pyridine, and mixtures thereof.

66. The method of claim 43, wherein at least one cathode is a lithium metal oxide cathode and at least one anode is a carbon or lithium metal anode.

67. The method of claim 43, wherein at least one cathode includes a material chosen from the group consisting of: $LiCoO_2$, $LiNiO_2$, $LiNi_{1-x}Co_yMe_zO_2$, $LiMn_{0.5}Ni_{0.5}O_2$, $LiMn_{0.3}Ni_{0.3}O_2$, $LiFePO_4$, $LiMn_2O_4$, $LiFeO_2$, $LiMc_{0.5}Mn_{1.5}O_4$, vanadium oxide, and mixtures thereof, wherein Me is Al, Mg, Ti, B, Ga or Si, and Mc is a divalent metal.

68. The method of claim 43, wherein at least one anode includes a material chosen from the group consisting of: graphite, carbon, $Li_4Ti_5O_{12}$, tin alloys, silica alloys, intermetallic compounds, lithium metal, and mixtures thereof.

69. The method of claim 43, wherein the electrolyte is a liquid.

70. The method of claim 43, wherein the electrolyte is a solid.

71. The method of claim 43, wherein forming the electrolyte includes forming an interpenetrating network.

72. The device of claim 17, wherein m is 0;
$R_{38}$ is an organic spacer; and
the organic spacer represented by $R_{40}$ includes an oxygen linked directly to a silicon on the backbone of the polysiloxane.

73. The device of claim 20, wherein the variable $R_{94}$ in the substituent represented by $Z_1$ is nil.

* * * * *